(12) United States Patent
Hah et al.

(10) Patent No.: US 12,008,469 B1
(45) Date of Patent: Jun. 11, 2024

(54) ACCELERATION OF NEURAL NETWORKS WITH STACKS OF CONVOLUTIONAL LAYERS

(71) Applicant: Amazon Technologies, Inc., Seattle, WA (US)

(72) Inventors: Thiam Khean Hah, Milpitas, CA (US); Randy Renfu Huang, Morgan Hill, CA (US); Richard John Heaton, San Jose, CA (US); Ron Diamant, Santa Clara, CA (US); Vignesh Vivekraja, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 755 days.

(21) Appl. No.: 17/009,517

(22) Filed: Sep. 1, 2020

(51) Int. Cl.
*G06N 3/08* (2023.01)
*G06F 13/20* (2006.01)
*G06N 3/04* (2023.01)

(52) U.S. Cl.
CPC .............. *G06N 3/08* (2013.01); *G06F 13/20* (2013.01); *G06N 3/04* (2013.01)

(58) Field of Classification Search
CPC ............................. G06N 3/063; G06N 3/049
See application file for complete search history.

(56) References Cited

U.S. PATENT DOCUMENTS

| 10,878,316 | B2 | 12/2020 | Ross | |
|---|---|---|---|---|
| 10,984,290 | B1* | 4/2021 | Goel | G06N 20/00 |
| 2018/0075343 | A1* | 3/2018 | van den Oord | G06N 3/084 |
| 2018/0307980 | A1 | 10/2018 | Barik et al. | |
| 2019/0012295 | A1* | 1/2019 | Yinger | G06F 17/16 |
| 2019/0114547 | A1* | 4/2019 | Jaganathan | G16B 50/00 |
| 2019/0130269 | A1* | 5/2019 | Nicol | G06N 3/045 |
| 2019/0340508 | A1 | 11/2019 | Liu et al. | |
| 2019/0370645 | A1 | 12/2019 | Lee et al. | |
| 2019/0377965 | A1 | 12/2019 | Totolos, Jr. et al. | |
| 2020/0302297 | A1 | 9/2020 | Jaganathan et al. | |
| 2021/0192328 | A1 | 6/2021 | Ross | |

FOREIGN PATENT DOCUMENTS

CN 111563586 A * 8/2020 ............... G06N 3/04

OTHER PUBLICATIONS

Huang et al, "eCNN: A Block-Based and Highly-Parallel CNN Accelerator for Edge Inference," Oct. 2019, MICRO '52: Proceedings of the 52nd Annual IEEE/ACM International Symposium on Microarchitecture (Year: 2019).*

(Continued)

*Primary Examiner* — Michael J Huntley
*Assistant Examiner* — Paul J Breene
(74) *Attorney, Agent, or Firm* — Weaver Austin Villeneuve & Sampson LLP

(57) ABSTRACT

A single neural network model can be used by each computing engine (CE) in a neural network processor to perform convolution operations in parallel for one or more stacks of convolutional layers. An input feature map can be divided into N chunks to be processed by N CEs, respectively. Each CE can process a last portion of a respective chunk to generate respective shared states to be used by a subsequent CE. A first CE uses pre-computed states to generate a first portion of an output feature map, while other CEs use shared states computed by a preceding CE to generate respective portions of the output feature map.

20 Claims, 15 Drawing Sheets

(56) References Cited

OTHER PUBLICATIONS

Claessens et al, "Convolutional Neural Networks for Automatic State-Time Feature Extraction in Reinforcement Learning Applied to Residential Load Control," IEEE Transactions on Smart Grid, vol. 9, No. 4, Jul. 2018 (Year: 2018).*

Guimin et al, "Image super-resolution using a dilated convolutional neural network," Neurocomputing, vol. 275, Jan. 31, 2018, pp. 1219-1230 (Year: 2018).*

"Dilated Convolution Neural Network with LeakyReLU for Environmental Sound Classification" Zhang et al, ADSPLab/ELIP/ Shenzhen Key Laboratory for IMVR Peking University Shenzhen Graduate School (Year: 2017).*

"Parallel Deep Convolutional Neural Network Training by Exploiting the Overlapping of Computation and Communication," Lee et al, 2017, 2017 IEEE 24th International Conference on High Performance Computing (Year: 2017).*

"Finding Structure in Time," Elman, 1990, Cognitive Science 14, 179-211 (Year: 1990).*

U.S. Appl. No. 17/009,483, "Accelerated Convolution of Neural Networks", filed Sep. 1, 2020.

Im, D., et al., "DT-CNN: Dilated and Transposed Convolution Neural Network Accelerator for Real-time Image Segmentation on Mobile Devices," 2019 IEEE International Symposium on Circuits and Systems (ISCAS), 2019, pp. 1-5.

Pooja, K., et al., "Multi-Scale Dilated Residual Convolutional Neural Network for Hyperspectral Image Classification," 2019 10th Workshop on Hyperspectral Imaging and Signal Processing: Evolution in Remote Sensing (WHISPERS), IEEE, 2019, pp. 1-5.

U.S. Non-Final Office Action dated Jun. 9, 2023 in U.S. Appl. No. 17/009,483.

U.S. Final Office Action dated Oct. 19, 2023 in U.S. Appl. No. 17/009,483.

* cited by examiner

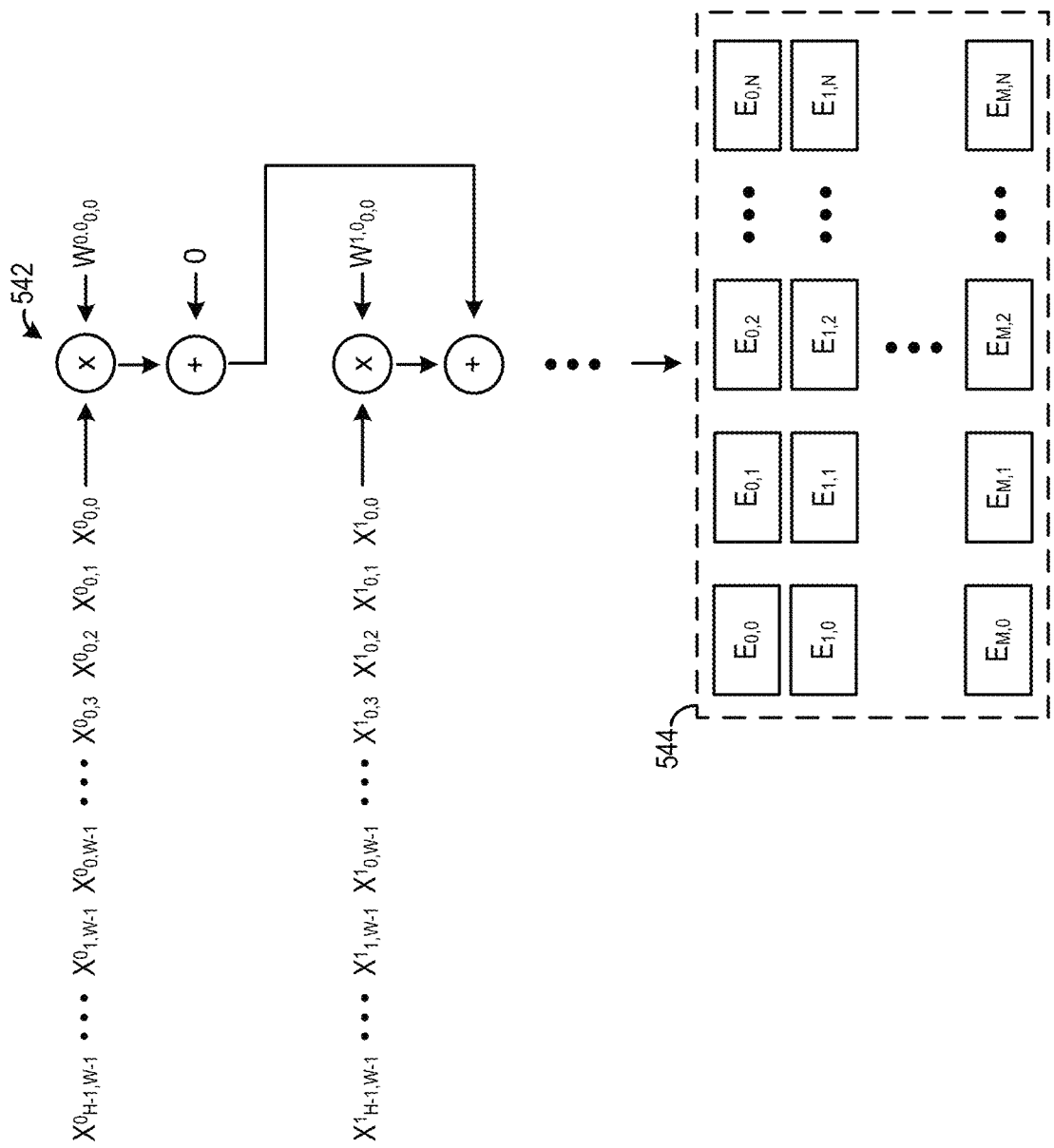

1100

```
┌─────────────────────────────────────────────────────────────────────────┐
│ RECEIVE, BY A FIRST COMPUTING ENGINE (CE) AND A SECOND CE, AN INPUT     │
│ DATASET DIVIDED INTO CHUNKS COMPRISING A FIRST CHUNK AND A SECOND       │
│ CHUNK TO GENERATE RESPECTIVE PORTIONS OF AN OUTPUT DATASET USING        │
│ CONVOLUTION OPERATIONS. THE FIRST CE RECEIVES A MIDDLE PORTION AND A    │──1102
│ LAST PORTION OF THE FIRST CHUNK, AND THE SECOND CE RECEIVES A MIDDLE    │
│ PORTION AND A LAST PORTION OF THE SECOND CHUNK. THE LAST PORTION OF     │
│ THE FIRST CHUNK OVERLAPS WITH A FIRST PORTION OF THE SECOND CHUNK       │
└─────────────────────────────────────────────────────────────────────────┘
                                    │
                                    ▼
┌─────────────────────────────────────────────────────────────────────────┐
│ PROCESS, BY EACH OF THE FIRST CE AND THE SECOND CE, A RESPECTIVE LAST   │──1104
│ PORTION OF A RESPECTIVE CHUNK TO COMPUTE RESPECTIVE SHARES STATES       │
└─────────────────────────────────────────────────────────────────────────┘
                                    │
                                    ▼
┌─────────────────────────────────────────────────────────────────────────┐
│ PROCESS, BY EACH OF THE FIRST CE AND THE SECOND CE, A RESPECTIVE MIDDLE │
│ PORTION OF THE RESPECTIVE CHUNK TO GENERATE A FIRST SUB-PORTION OF A    │──1106
│ RESPECTIVE PORTION OF THE OUTPUT DATASET                                │
└─────────────────────────────────────────────────────────────────────────┘
                                    │
                                    ▼
┌─────────────────────────────────────────────────────────────────────────┐
│ RECEIVE, BY EACH OF THE FIRST CE AND THE SECOND CE, RESPECTIVE SHARED   │
│ STATES WHILE PROCESSING THE MIDDLE PORTION OF THE RESPECTIVE CHUNK.     │
│ THE RESPECTIVE SHARED STATES RECEIVED BY THE SECOND CE ARE COMPUTED     │──1108
│ BY THE FIRST CE AND THE RESPECTIVE SHARED STATES RECEIVED BY THE        │
│ FIRST CE ARE PRE-COMPUTED STATES                                        │
└─────────────────────────────────────────────────────────────────────────┘
                                    │
                                    ▼
┌─────────────────────────────────────────────────────────────────────────┐
│ GENERATE, BY EACH OF THE FIRST CE AND THE SECOND CE, A SECOND SUB-      │
│ PORTION OF THE RESPECTIVE PORTION OF THE OUTPUT DATASET USING THE       │──1110
│ RECEIVED RESPECTIVE SHARED STATES                                       │
└─────────────────────────────────────────────────────────────────────────┘
```

FIG. 11

ACCELERATION OF NEURAL NETWORKS WITH STACKS OF CONVOLUTIONAL LAYERS

BACKGROUND

Artificial neural networks are computing systems with an architecture based on biological neural networks. An artificial neural network may include multiple layers of processing nodes which can be used to perform inferences on input feature maps. Each processing node on a layer can perform computations on input data generated by processing nodes on a preceding layer to generate output data.

Convolutional neural network (CNN) is a neural network based on a deep learning architecture. A convolution operation can include applying a convolution kernel to an input feature map in a sliding window that is restricted to a small region of the entire input space also called receptive field. Dilated CNNs can provide a way of increasing receptive fields exponentially without loss of resolution or coverage, which can be beneficial in certain applications that require a wider context, such as speech synthesis or object detection.

BRIEF DESCRIPTION OF THE DRAWINGS

Various embodiments in accordance with the present disclosure will be described with reference to the drawings, in which:

FIGS. 5A-5C illustrate an example neural network processor and its operations, according to certain aspects of the disclosed technologies;

FIG. 11 includes a flowchart illustrating a method implemented by the CEs according to the second embodiment.

DETAILED DESCRIPTION

Figure 1A:
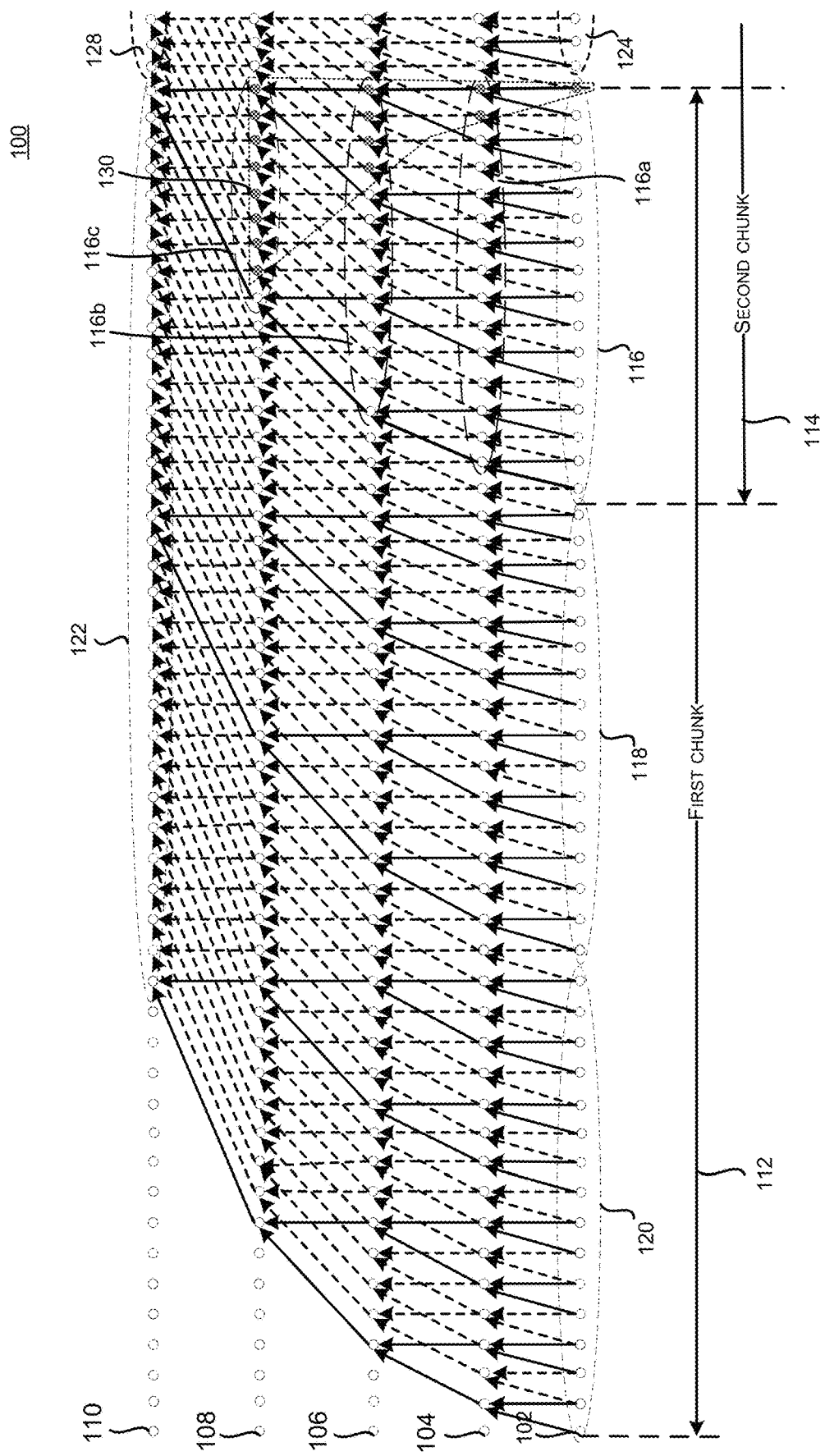
FIGS. 1A and 1B illustrate portions of a one dimensional (1D) dilated convolutional neural network (CNN), which can be used to describe certain embodiments.

Disclosed technologies relate to neural networks, in particular, acceleration of a dilated convolutional neural network (CNN) executing on multiple cores of a neural network processor. CNN is a type of neural network that is based on a deep learning architecture.

An artificial neural network may generally include multiple processing nodes arranged on two or more layers, where processing nodes on one layer may connect to processing nodes on another layer. The processing nodes can be divided into layers including, e.g., an input layer, a number of intermediate layers (also known as hidden layers), and an output layer. The input layer may receive an input tensor also called an input feature map. The hidden layers may perform convolution operations and non-linear activations to extract latent features from a set of features (or states) generated by preceding layers. A convolution operation can include applying a convolution kernel to the input tensor in a sliding window that is restricted to a small region of the entire input space also called receptive field. The weighted convolution kernel is applied (tiled over) to the entire input space, and generates a feature map. For example, each processing node on a layer may receive a stream of input data elements, multiply each input data element with a weight, compute a weighted sum of the input data elements, and forward the weighted sum to the next layer. The output layer may produce an output tensor also called an output feature map. An artificial neural network, such as a CNN, may include thousands or more of processing nodes and millions or more of weights and input data elements.

CNNs are widely used in processing sequential data. Generally, for the CNNs, size of the receptive field is linearly related to the number of layers and the kernel width. Therefore, in CNNs, to cover a longer sequence, a larger receptive field may be required which may translate to more layers and a difficult training process. Dilated CNNs can provide a way of increasing receptive fields exponentially without loss of resolution or coverage. Dilated CNNs can be especially useful in applications which focus more on integrating knowledge of the wider context with less cost. In dilated CNNs, the receptive field can be expanded exponentially by stacking layers of convolutions with increasing dilated values so they have large receptive fields with a small number of back propagation steps. Additionally, the dilated convolutions can reduce the number of weights thus saving the computational cost. However, for large input feature maps (e.g., speech synthesis, object detection), processing time of dilated convolutions is typically input feature map memory bound since these large input feature maps may not fit in the on-chip memory and may have to be fetched from the system or an external memory (e.g., a DRAM). This can impact the inference performance especially in inference accelerators with low memory bandwidth.

A stack of dilated CNN can include an input layer, one or more hidden layers and an output layer. The input layer can be at the bottom of the stack that processes the input feature maps. The data flows from the inputs at the bottom to the outputs at the top. For example, the CNN can be a 4 layers deep one dimensional (1D) dilated CNN. The dilation rate of each layer may increase exponentially from the bottom layer to the top layer. Each layer can process the output states generated by the layer below at their respective dilation rate. The input layer can receive the input feature maps and forward to a first hidden layer without any processing. The first hidden layer can process output states of the input layer at a dilation rate of 1 (standard convolution). A second hidden layer can process output states of the first hidden layer at a dilation rate of 2. A third hidden layer can process output states of the second hidden layer at a dilation rate of 4. The output layer can process output states of the third hidden layer at a dilation rate of 8. For large input feature maps, the output states generated by each layer can be very large and are typically stored in the system memory during layer evaluation since they cannot fit in the on-chip memory. The output states generated by a preceding layer can be read back from the system memory for evaluating the next layer. However, these memory accesses can impact the inference performance.

In certain implementations, the performance can be improved by splitting a large input feature map spatially into multiple small chunks and the inference can be run on each of these chunks. Typically, the chunk is sized such that the performance is compute bound. The entire CNN can be evaluated by traversing and computing the outputs one chunk at a time, until the full input feature map is processed. The nature of the network can entail states to flow from one chunk to another chunk to calculate the output feature map. Generally, these shared states are re-computed for each chunk that can cause a lot of redundant computing. This may be especially true for the CNNs with huge receptive fields in networks like Parallel-Wavenet. In some implementations, to prevent re-computation of the shared states for each chunk, the shared states can be stored in the system memory after processing a chunk and can be retrieved from the system memory for processing the next chunk. However, this solution can cause memory bandwidth bottlenecks.

Certain embodiments can efficiently map inference of a large input feature map dilated CNN in a neural network processor with multiple cores or computing engines (CEs). The dilated CNN can be split spatially across multiple CEs such that each CE processes different portions of the input feature map to produce a respective portion of the output feature map. The overlapping intermediate states computed by one CE can be stored locally for sharing with another CE using an on-chip bus. Each CE may comprise a systolic array of processing elements, and a local memory, among other components. The processing elements can perform arithmetic operations on the input data elements given a filter to generate the intermediate states and the output feature map for the convolution operations. The local memory can be used to store data associated with the convolution operations.

According to certain embodiments, a compiler can generate instructions for implementing a method to accelerate a given neural network model for a dilated CNN. A large input feature map can be spatially divided into N chunks to eliminate the memory bandwidth bottlenecks. Each of the N chunks can be assigned to a respective CE from N CEs to generate a respective portion of the output feature map. A last portion of each chunk may overlap with a first portion of a subsequent chunk. Each CE can process a respective middle and last portion of its assigned chunk in parallel. A respective first portion of each chunk can be processed by a respective preceding CE to generate respective shared states to be used by both CEs. Thus, re-computation of the shared states can be eliminated by caching these shared states in a local memory of each given CE and transmitting the shared states to a subsequent CE via an internal bus to be used by the subsequent CE for generating their portion of the output feature map. The internal bus can be a higher performance on-chip bus (e.g., PCI protocol based bus) than the system memory interface and therefore the transfer of the shared states over the on-chip bus may provide improved performance as compared to fetching the shared states from the system memory.

As an example, the N chunks may include a first chunk and a second chunk assigned to a first CE and a second CE, respectively, from the N CEs to generate a first output dataset and a second output dataset corresponding to the output feature map. In a first embodiment, the first CE may receive a first portion, a middle portion, and a last portion of the first chunk to generate the first output dataset. The last portion of the first CE may overlap with a first portion of the second CE and can be processed by the first CE to compute shared states that can be used by both the first CE and the second CE. The second CE may receive a middle portion and a last portion of the second chunk, and the shared states computed by the first CE to generate the second output dataset.

In a first step, the first CE may process the last portion of the first chunk to compute a first set of states, and the second CE may process the last portion of the second chunk to compute a second set of states. The first set of states may include first shared states and can be stored in the local memory of the first CE, and the second set of states may include second shared states and can be stored in the local memory of the second CE. In a second step, the second CE may process the middle portion of the second chunk to generate a first portion of the second output dataset. The first portion of the second output dataset has no dependency on the first shared states. While the second CE is processing the middle portion of the second chunk, the first CE may transmit (or copy) the first shared states computed in the first step to the second CE via the internal bus. The first CE may simultaneously process the middle portion of the first chunk to generate a first portion of the first output dataset. In a third step, the second CE may generate a second portion of the second output dataset using the first shared states received from the first CE. The first CE may simultaneously generate a second portion of the first output dataset by processing the first portion of the first chunk or using pre-computed states received as shared states from a preceding CE. Thus, inference operations can be accelerated by processing respective portions of multiple chunks in parallel and sharing states between the first CE and the second CE, which can eliminate memory bandwidth issues as well as re-computations of the shared states. In different embodiments, division of the chunks can be determined based on the size of the systolic array in the CEs, transmission capacity of the internal bus, or size of the local memory used to store the intermediate states, among others.

In certain examples, multiple iterations of the data flow can be performed through a dilated CNN to improve inference quality for applications such as speech synthesis. For example, outputs generated by the flow for each iteration can be passed as an input at the next iteration to transform uncorrelated noise into structured samples. This can be achieved by stacking multiple dilated CNNs. An output of a bottom stack may be passed as an input to a next stack to improve the inference quality. As discussed above, each stack of the dilated CNN may include an input layer at the bottom followed by multiple hidden layers and an output layer, with an increasing dilation rate from the bottom to the top.

According to the embodiments, the input dataset for each stack can be divided into N chunks assigned to the N CEs, respectively. Each CE can process portions of a respective chunk to generate a respective portion of the output feature map, and respective shared states to be used by a subsequent CE. As discussed above, the shared states may be computed by each CE using the last portion of the respective chunk overlapping with a first portion of a subsequent chunk assigned to the next CE. Each CE, other than the first CE, can use the shared states received from the preceding CE to generate a respective portion of the output feature map. In the absence of a preceding CE, the first CE may have to calculate the initial states using a first portion of the first chunk. Thus, in most systems, separate neural network models may be used for performing convolution operations. A first model used by the first CE may not receive shared states from a preceding CE and may include additional convolution operations to compute the initial states, A second model used by the other CEs can use the shared states generated by the preceding CE. Using two models to perform convolutions operations for making inferences can add complexity to compiler structure and involve additional computations.

Certain embodiments can enable the use of a single neural network model to be used by each CE in parallel by using shared states for each CE along with portions of their respective chunks to perform the convolution operations. For example, the first CE can receive pre-computed states as the shared states while the other CEs receive the shared states computed by a respective preceding CE. Based on the application of the neural network, the pre-computed states can be generated previously, assigned fixed or known values, or computed using an initial portion of the first chunk. For example, initial states for the first CE can be pre-computed prior to performing the convolution operations and can be received by the first CE as the shared states. Thus, certain embodiments can eliminate the need for two separate models by using shared states for each CE for performing the convolution operations, thus simplifying the compiler structure. Furthermore, having stacks of convolutional layers in place of a single stack with a large number of convolutional layers can allow a smaller number of respective pre-computed states for each stack, thus reducing overall computations. Additionally, stacks of the dilated CNNs can be accelerated by processing multiple portions of the chunks using the respective CEs executing in parallel.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1B:
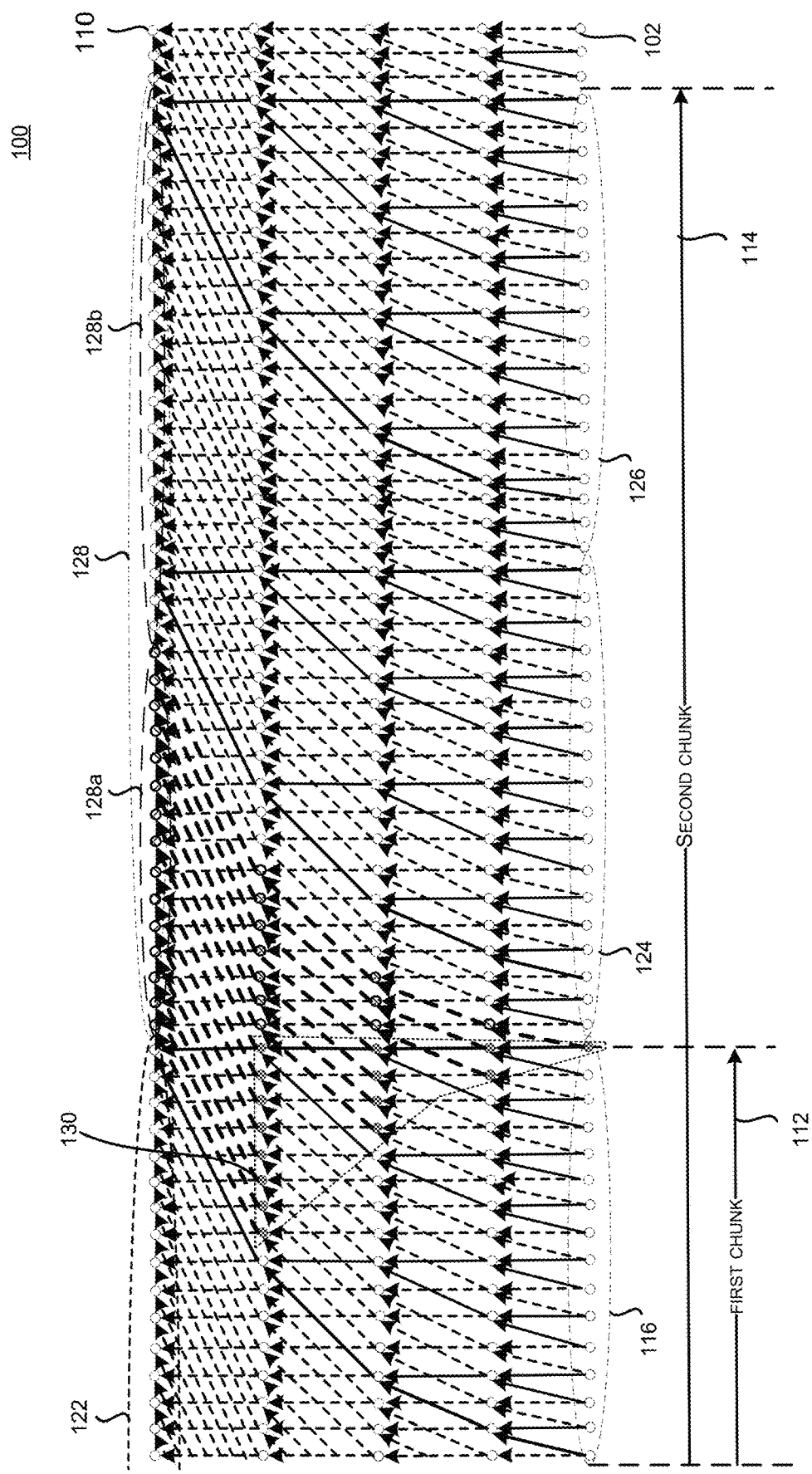

FIGS. 1A and 1B illustrate portions of a one dimensional (1D) dilated CNN 100, which can be used to describe certain embodiments. Note that the dilated CNN 100 has been split into FIGS. 1A and 1B for ease of illustration.

The 1D dilated CNN 100 may comprise a stack of an input layer 102, a first hidden layer 104, a second hidden layer 106, a third hidden layer 108, and an output layer 110. Each circle or node in the dilated CNN 100 may represent a feature map or a state. The data flows from the input layer 102 at the bottom to the output layer 110 at the top. For example, the input layer 102 may receive an input dataset corresponding to an input feature map comprising input data elements associated with an image being submitted for identification or object recognition, an audio clip being provided for speech recognition, a string of text for natural language processing or machine translation, or the current state of a game requiring analysis to determine a next move, among other things. The weights may be preloaded for each layer. The input layer 102 may not perform any computations and pass the input data elements to the first hidden layer 104. The first hidden layer 104 may process the input data elements received from the input layer 102 at a first dilation rate to compute first intermediate states. The second hidden layer 106 may process the first intermediate states received from the first hidden layer 104 at a second dilation rate to compute second intermediate states. The third hidden layer 108 may process the second intermediate states received from the second hidden layer 106 at a third dilation rate to compute third intermediate states. The output layer 110 may process the third intermediates states received from the third hidden layer 108 at a fourth dilation rate to generate an output dataset corresponding to an output feature map.

As an example, the first hidden layer 104 may evaluate the output states of the input layer 102 at a dilation rate of 1 (every state considered), the second hidden layer 106 may evaluate the output states of the first hidden layer 104 at a dilation rate of 2 (every other state considered), the third hidden layer 108 may evaluate the output states of the second hidden layer 106 at a dilation rate of 4 (every 4th state considered), and the output layer 110 may evaluate the output states of the third hidden layer 108 at the dilation rate of 8 (every 8th state considered). Note that the dilated CNN 100 is shown to include five layers in FIGS. 1A and 1B for ease of illustration. However, it will be understood that a dilated CNN may include tens, hundreds, thousands or more layers based on the application. In certain embodiments, multiple dilated CNNs can be stacked to improve the quality of the inference operations. For example, the output dataset generated by the output layer 110 for the dilated CNN 100 can be fed as the input dataset to an input layer of a second stack. Similarly, the output dataset generated by the output layer 110 for the dilated CNN 100 for the second stack can be fed as the input dataset to an input layer of a third stack, and so on.

In certain examples, an input dataset for an input feature map can be divided into chunks comprising a first chunk 112 and a second chunk 114 assigned to a first CE and a second CE, respectively, to generate a respective portion of an output dataset corresponding to the output feature map. The first CE and the second CE may represent a first core and a second core of a neural network processor. Each of the first CE and the second CE may include a respective systolic array to perform the dilated convolution operations, and a local memory among other components. For example, each systolic array may include processing elements arranged in rows and columns to perform arithmetic operations on the input dataset elements or the intermediate states using appropriate weights.

As shown in FIGS. 1A and 1B, a last portion of the first chunk 112 may overlap with a first portion of the second chunk 114. For example, an overlapping portion 116 can include a last portion of the first chunk 112 and a first portion of the second chunk 114. The first chunk 112 may include a first portion 120, a middle portion 118, and the overlapping last portion 116. The second chunk 114 may include the overlapping first portion 116, a middle portion 124, and a last portion 126. The overlapping portion 116 may be used to compute a set of states by performing the convolution operations, which may be used by both the first CE and the second CE to generate a portion of their output datasets 122 and 128, respectively. The first CE may perform convolution operations on the overlapping portion 116 to compute a set of states comprising first intermediate states 116a, second intermediate states 116b, and third intermediate states 116c. For example, the first intermediate states 116a may be computed by the first hidden layer 104 using the input dataset elements received from the input layer 102 at the dilation rate of 1, second intermediate states 116b may be computed by the second hidden layer 106 using the first intermediate states 116a received from the first hidden layer 104 at the dilation rate of 2, and the third intermediate states 116c may be computed by the third hidden layer 108 using the second intermediate states 116b received from the second hidden layer 106 at the dilation rate of 4. The third intermediate states 116c may be used by the output layer 110 to generate a portion of the output dataset 122 at the dilation rate of 8.

In certain systems, the second CE may re-compute the overlapping first intermediate states 116a, second intermediate states 116b, and the third intermediate states 116c again when it begins to process the second chunk 114. However, this solution may cause unnecessary additional computations and may be compute bound. In certain other systems, to eliminate re-computing of the overlapping states 116a-116c by the second CE, the first CE may store the overlapping states 116a-116c in a system memory (e.g., DRAM) when processing the first chunk 112. The second CE may retrieve the stored overlapping states 116a-116c from the system memory when the second CE begins to process the second chunk 114. However, this solution may introduce additional memory accesses and can be memory bandwidth limited.

Certain embodiments of the disclosed technologies can eliminate the re-computations or unnecessary memory accesses by storing the set of states 116a-116c computed by the first CE in a local memory of the first CE. However, as shown in FIGS. 1A and 1B, only a portion of the set of states 116a-116c and the overlapping portion 116, as represented by shared states 130, may be needed by the second CE to compute a sub-portion 128a of its output dataset 128. For the example dilated CNN 100 illustrated in FIG. 1A, the shared states 130 (shown by dark circles in the triangular section) may include an input data element from the input dataset, two states from the first intermediate states 116a, four states from the second intermediate states 116b, and eight states from the third intermediate states 116c. The shared states 130 can be transmitted to the second CE using a high performance internal bus. Certain embodiments can accelerate the dilated CNN 100 by enabling the first CE and the second CE to process different portions of their respective chunks in parallel to generate respective portions of the output feature map as explained below.

For example, in a first step, the first CE can process the overlapping portion 116 to compute the set of states 116a-116c. The first CE may compute the first intermediate states 116a by performing convolution operations on the input data elements from the overlapping portion 116 using a first filter for the first hidden layer 104. The first CE may compute the second intermediate states 116b by performing convolution operations on the first intermediate states 116a using a second filter for the second hidden layer 106. The first CE may compute the third intermediate states 116c by performing convolution operations on the second intermediate states 116c using a third filter for the third hidden layer 108. The first filter, second filter and the third filter may include same or different values. The first CE can store the set of states 116a-116c and the overlapping portion 116 in a local memory, which can be used by the first CE to generate a portion of the output dataset 122. However, only the shared states 130 may be needed by the second CE to generate a portion of the output dataset 128. In certain examples, the second CE may process the last portion 126 of the second chunk 114, while the first CE is processing the overlapping portion 116, even if the last portion 126 is not overlapping with a subsequent CE.

In a second step, the first CE can transmit (or copy) the shared states 130 to the second CE using an internal bus. The internal bus can be a high performance bus connecting different cores of a neural network processor. The internal bus may include any variation of a peripheral component interconnect (PCI) bus, advanced peripheral bus (APB), AMBA Advanced eXtensible Interface (AXI), or AMBA High-performance Bus (AHB), among others. While the first CE is transmitting the shared states 130, the second CE can process the middle portion 124 of the second chunk 114 to generate a sub-portion 128b of the output dataset 128 that has no dependency on the shared states 130, as shown in FIG. 1B. The first CE can simultaneously process the middle portion 118 to generate a sub-portion of the output dataset 122. The sub-portion of the output dataset 122 can be generated with or without using the set of states 116a-116c since the set of states 116a-116c are stored in the local memory of the first CE.

In a third step, the second CE may receive the shared states 130 from the first CE and process the received shared states to generate a sub-portion 128a of the output dataset 128 that has dependency on the shared states 130. In parallel, the first CE can process the first portion 120 of the first chunk 112 to generate a sub-portion of the output dataset 122. Thus, as discussed with reference to steps 1, 2, and 3, the first CE may process the first portion 120, middle portion 118, and the last portion 116 of the first chunk 112, whereas the second CE may only process the middle portion 124 and the last portion 126 of the second chunk 114 since the first portion of the second chunk 114 overlaps with the last portion of the first chunk 112 and is processed by the first CE. Therefore, the shared states generated from the overlapping portion 116 can only be computed once by the first CE and used by both the first CE and the second CE to generate respective portions of the output dataset.

In certain embodiments, states associated with the first portion 120 of the first chunk 112 may be pre-computed so that both the first CE and the second CE can use the respective received states to generate the respective portions of the output dataset. For example, the pre-computed states can be received by the first CE as shared states from a preceding CE, and the shared states 130 can be received by the second CE from the first CE. In various embodiments, the pre-computed states for the first CE can be determined based on the application of the neural network model. As an example, for speech synthesis, the first portion 120 of the input dataset may include silence portion of the audio data and can be assigned static values. In other embodiments, the pre-computed states can be computed prior to making the inference and can be provided to the first CE as known values. This is further explained with reference to FIG. 2.

In certain embodiments, the chunk size assigned to each CE can vary. For example, one of the CEs can perform more computations than the other CE to optimize the compute time or transmission time among the CEs. In one example, the first CE may compute additional portion of the first chunk 112 than the overlapping portion 116 in step 1 to optimize the compute time. In another example, based on the transmission capacity and the transmission time, the number of computations performed in step 2 may be controlled. For example, if the transmission time is slow, more computations can be performed in step 2 than step 3, and if the transmission time is fast, more computations can be performed in step 3 than step 2. In certain embodiments, to improve the inference quality, multiple iterations of the data flow through a neural network can be performed by stacking multiple neural network models such as the dilated CNN 100. For example, outputs generated from each iteration can be passed as an input at the next iteration. This is further explained with reference to FIGS. 4A and 4B.

Figure 2:
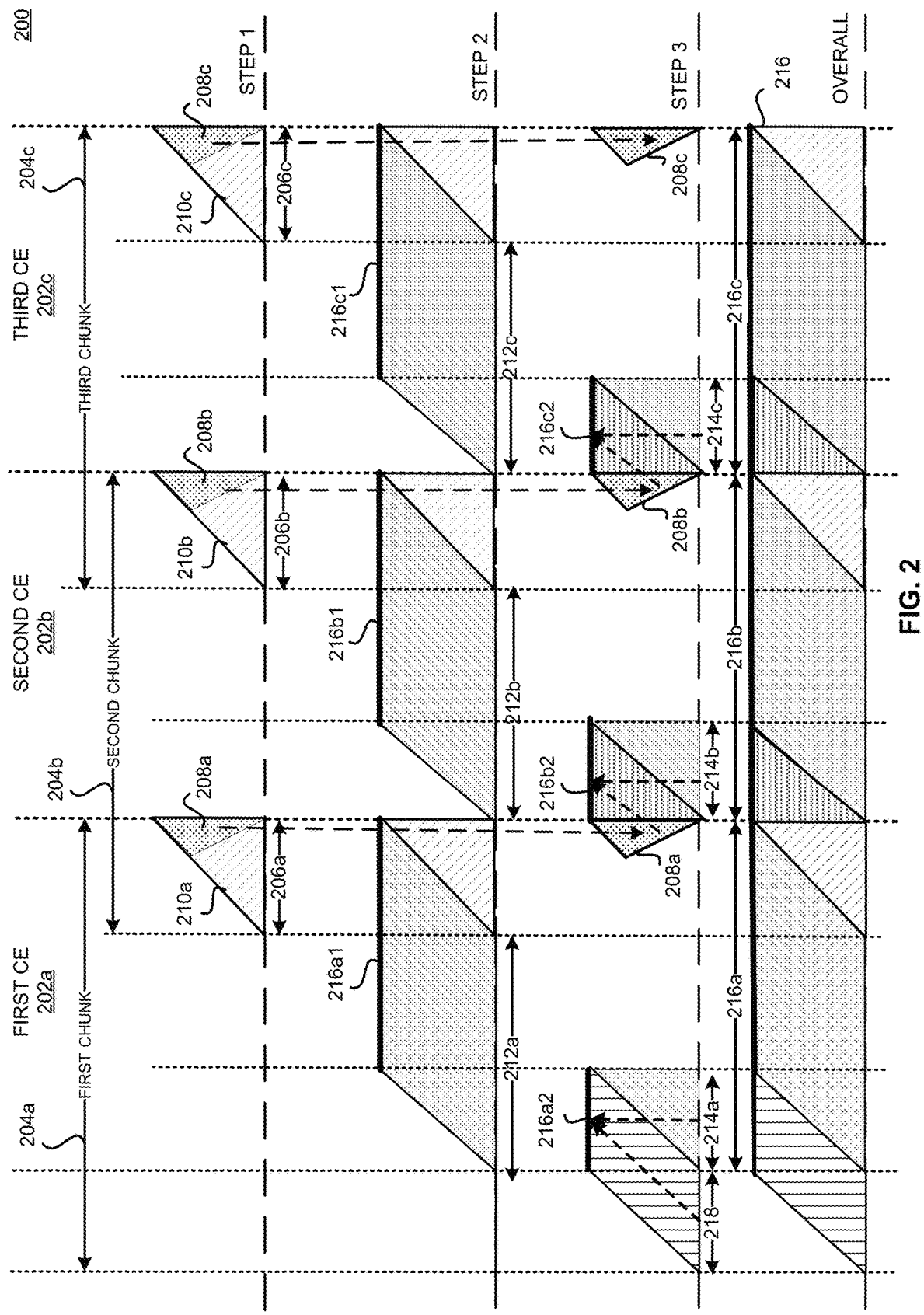
FIG. 2 illustrates an example process performed by N computing engines (CEs) in parallel to accelerate dilated CNN operations according to a first embodiment.

FIG. 2 illustrates an example process 200 performed by N CEs in parallel to accelerate dilated CNN operations according to a first embodiment. N can be a positive integer equal to or greater than two. For example, a dilated CNN similar to the dilated CNN 100 can be compiled by a compiler to generate instructions that can be executed by the N CEs to perform the process 200. The N CEs may represent multiple cores of a neural network processor, alternatively termed as an acceleration engine in this specification.

As illustrated in FIG. 2, the N CEs may include a first CE 202a, a second CE 202b, and a third CE 202c. The first CE 202a, second CE 202b, and the third CE 202c may execute each of step 1, step 2, and step 3 in parallel to perform convolution operations on an input dataset corresponding to an input feature map to generate respective portions 216a, 216b, and 216c of an output dataset 216 corresponding to an output feature map. The input dataset may be spatially divided into N chunks comprising a first chunk 204a, a second chunk 204b and a third chunk 204c assigned to the first CE 202a, second CE 202b, and the third CE 202c, respectively. A last portion of the first chunk 204a may overlap with a first portion of the second chunk 204b as shown by an overlapping portion 206a, and a last portion of the second chunk 204b may overlap with a first portion of the third chunk 204c as shown by an overlapping portion 206b. A last portion 206c of the third chunk 204c may overlap with a first portion of a subsequent CE (if available). The overlapping portions 206a, 206b, and 206c for each CE may be similar to the overlapping portion 116 in FIGS. 1A and 1B.

In step 1, each CE may process a respective last portion in parallel to compute respective set of states using the convolution operations that includes shared states to be used by a respective subsequent CE. For example, the first CE 202a can process the last portion 206a to compute a set of states 210a that includes shared states 208a to be used by the second CE 202b, second CE 202b can process the last portion 206b to compute a set of states 210b that includes shared states 208b to be used by the third CE 202c, and the third CE 202c can process the last portion 206c of the third chunk 204c to compute a set of states 210c that includes shared states 208c. The shared states 208c can be used internally by the third CE 202c to generate the respective portion of the output dataset, and may not be shared with another CE. The set of states 210a, 210b, and 210c may be computed by different layers of the dilated CNN executed on the first CE 202a, second CE 202b, and the third CE 202c, respectively, similar to the set of states computed by processing the overlapping portion 116 in FIG. 1. The shared set of states 208a, 208b, and 208c may be similar to the shared states 130. Each computed set of states can be stored in a respective local memory of each CE. The set of states 210a can be stored in a local memory in the first CE, the set of states 210b can be stored in a local memory in the second CE, and the set of states 210c can be stored in a local memory in the third CE.

In step 2, each CE may process a second (non-overlapping or middle) portion of the respective chunk to generate a respective sub-portion of a respective portion of the output dataset, which has no dependency on the respective shared states computed by a respective preceding CE, while transmitting (or copying) the respective shared states to the respective subsequent CE via an internal bus. For example, the first CE 202a may process a non-overlapping or middle portion 212a of the first chunk 204a to generate a sub-portion 216a1 of the portion 216a, which has no dependency on the shared states generated by a preceding CE, while transmitting the stored shared states 208a to the second CE 202b. Simultaneously, the second CE 202b may process a non-overlapping or middle portion 212b of the second chunk 204b to generate a sub-portion 216b1 of the portion 216b, which has no dependency on the shared states 208a generated by the first CE 202a, while transmitting the stored shared states 208b to the third CE 202c. Simultaneously, the third CE 202c may process a non-overlapping or middle portion 212c of the third chunk 204c to generate a sub-portion 216c1 of the portion 216c, which has no dependency on the shared states 208b generated by the second CE 202b. The third CE 202c being the last CE may not transmit the stored shared states 208c to another CE and the stored shared states 208c can be used internally. The non-overlapping portions 212a, 212b, and 212c may be similar to the middle portions 118 and 124 in FIGS. 1A and 1B. Each CE may also use the respective stored set of states to generate the respective sub-portion of their output dataset. For example, the first CE 202a may use the stored set of states 210a computed in step 1 to generate the sub-portion 216a1, the second CE 202b may use the stored set of states 210b computed in step 1 to generate the sub-portion 216b1, and the third CE 202c may use the stored set of states 210c computed in step 1 to generate the sub-portion 216c1.

In certain instances, the N CEs may not be able to make an inference on a very large input feature map (for example, a very long sentence) in a single iteration due to the computation capacity of the CEs or size of the respective local memory, among others. Certain embodiments can allow dividing a very large input feature map into multiple input datasets such that each input dataset can be processed by the N CEs sequentially to make the inference. Each input dataset can be divided into N chunks and the shared states computed by the Nth CE for a given input dataset can be used as the pre-computed states by the first CE for the next input dataset. Referring back to FIG. 2, as an example, the input dataset comprising the first chunk 204a, second chunk 204b, and the third chunk 204c can be the first input dataset, and the stored shared states 208c computed using the first input dataset can be used as the pre-computed states by the first CE 202a for processing a next input dataset.

In step 3, each CE may receive the respective shared states from the respective preceding CE. For example, the second CE 202b may receive the shared states 208a from the first CE 202a, and the third CE 202c may receive the shared states 208b from the second CE 202b. Each CE may generate a respective sub-portion of the respective portion of the output dataset using the respective received shared states. In the first embodiment, the first CE 202a may not receive any shared states that have been pre-computed, and may process a first portion 218 of the first chunk 204a to generate a sub-portion 216a2 of the portion 216a using a portion 214a. The second CE 202b may use the received shared states 208a to generate a sub-portion 216b2 of the portion 216b. The third CE 202c may use the received shared states 208b to generate a sub-portion 216c2 of the portion 216c. The second CE 202b may use a portion 214b or intermediate states computed from the portion 212b in step 2 to generate the sub-portion 216b2. Similarly, the third CE 202c may use a portion 214c or intermediate states computed from the portion 212c in step 2 to generate the sub-portion 216c2. In certain examples, the initial portion 218 can be processed by the first CE in step 1 or step 2 to optimize the compute time of each CE or transmission time among the CEs.

Thus, as discussed above, each of the CEs 202a, 202b, and 202c may process their respective last portions 206a, 206b, and 206c simultaneously in step 1, and respective middle portions 212a, 212b, and 212c simultaneously in step 2. However, only the first CE 202a may process its first portion 218, whereas the second CE 202b and the third CE 202c may use the shared states computed by their respective preceding CEs 202a and 202b by processing the respective overlapping portions 206a and 206b. An overall output dataset 216 comprising the portions 216a, 216b and 216c can be an outcome of the inference operation performed on the input dataset by executing steps 1, 2 and 3. The steps 1, 2 and 3 can be executed to perform an inference operation on multiple sequential input datasets, which may correspond to a larger input feature map (e.g., for speech synthesis), as discussed previously.

Figure 3:
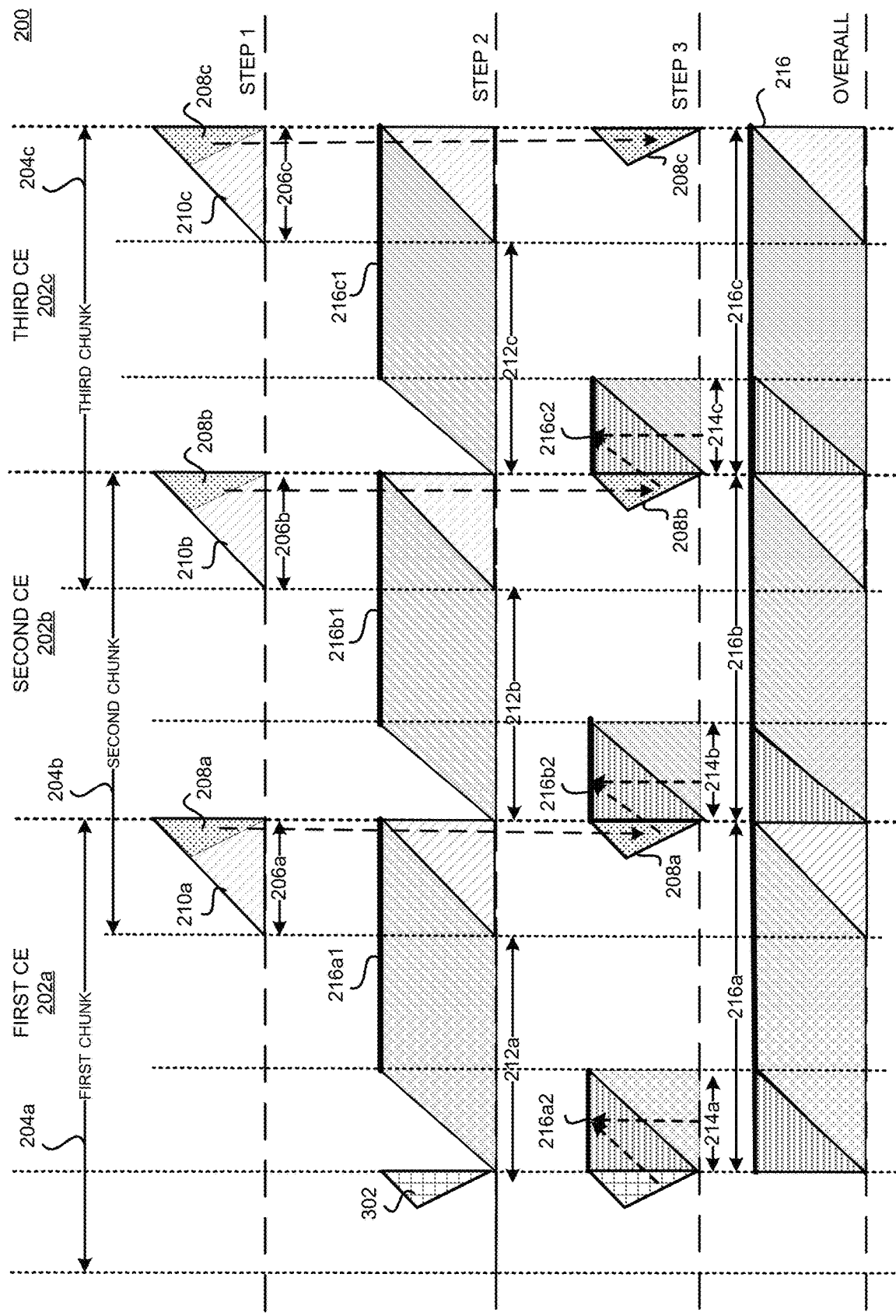
FIG. 3 illustrates an example process performed by the N CEs in parallel to accelerate the dilated CNN operations according to a second embodiment.

FIG. 3 illustrates an example process 300 performed by the N CEs in parallel to accelerate dilated CNN operations according to a second embodiment. For example, a dilated CNN similar to the dilated CNN 100 can be compiled by a compiler to generate instructions that can be executed by the N CEs to perform the process 300. As discussed with reference to FIG. 2, the N CEs may include the first CE 202a, second CE 202b, and the third CE 202c.

The step 1 for the example process 300 can be same as the step 1 for the example process 200 discussed with reference to FIG. 2. For example, in step 1, each CE can process a last portion of the respective chunk to compute a respective shared states to be used by a subsequent CE. The first CE 202a can process the last portion 206a to compute the shared states 208a to be used by the second CE 202b, second CE 202b can process the last portion 206b to compute the shared states 208b to be used by the third CE 202c, and the third CE 202c can process the last portion 206c to compute the shared states 208c to be used by an optional subsequent CE.

In step 2, each CE can process a middle portion of the respective chunk while receiving the respective shared states. For example, each CE can receive the respective shared states computed in step 1 from a preceding CE using an internal bus. The first CE 202a can process the middle portion 212a while receiving pre-computed states 302 as the shared states. The second CE 202b can process the middle portion 212b while receiving the shared states 208a from the first CE 202a, and the third CE 202c can process the middle portion 212c while receiving the shared states 208b from the second CE 202b. The first CE 202a can process the middle portion 212a. In certain embodiments, the pre-computed states 302 can be obtained by the first CE 202a prior to step 1. For example, the pre-computed states 302 can be randomly generated, have static or known values. In certain embodiments, the pre-computed states 302 can be computed previously using the first portion 218 of the first chunk 204a. In other examples, the pre-computed states can be assigned static or random values. For example, the first portion 218 of the input dataset may include silence (e.g., for speech recognition) or other known data. As discussed with reference to FIG. 2, each CE can also generate the respective sub-portions of the portions 216a, 216b and 216c of the output dataset 216 by processing the respective middle portion and using the respective set of states computed in step 1.

In step 3, each CE can generate a respective sub-portion of the respective portion of the output dataset using the received respective set of shared states. The first CE 202a can generate the sub-portion 216a2 of the portion 216a of the output dataset 216 using the pre-computed states 302 received as the set of shared states, second CE 202b can generate the sub-portion 216b2 of the portion 216b of the output dataset 216 using the received set of shared states 208a, and the third CE 202c can generate the sub-portion 216c2 of the portion 216c of the output dataset 216 using the received set of shared states 208b. Thus, use of the pre-computed states 302 by the first CE 202a can allow each CE to use the same set of instructions generated from the same neural network model for performing the convolution operations on the input dataset. Additionally, the process 300 can be executed on multiple input datasets belonging to a large input feature map for making an inference using the same neural network model.

In various embodiments, portions of the chunks to be processed by each CE may depend upon a number of factors, for example, compute capacity for each CE, size of the systolic array, size of the local memory, and transmission time to transfer the shared states, among others. For example, size of the portions 206a-206c, and the portions 212a-212c can vary based on the above factors. In some applications, number of chunks for a large input feature map can be more than the number of CEs. In such cases, a first set of N chunks can be processed by the N CEs followed by a second set of N chunks, and so on.

In certain examples, multiple iterations of the data flow can be performed through a dilated CNN to improve inference quality for applications such as speech synthesis. For example, outputs generated by the flow for each iteration can be passed as an input at the next iteration. This can be achieved by stacking multiple dilated CNNs. An output of a bottom stack may be passed as an input to a next stack. As discussed above, each stack of the dilated CNN may include an input layer, multiple hidden layers, and an output layer, with an increasing dilation rate from the bottom layer to the top layer for each stack. The stacks of dilated CNNs can be implemented using a single neural network model according to certain embodiments. This is further discussed with reference to FIGS. 4A and 4B.

Figure 4A:
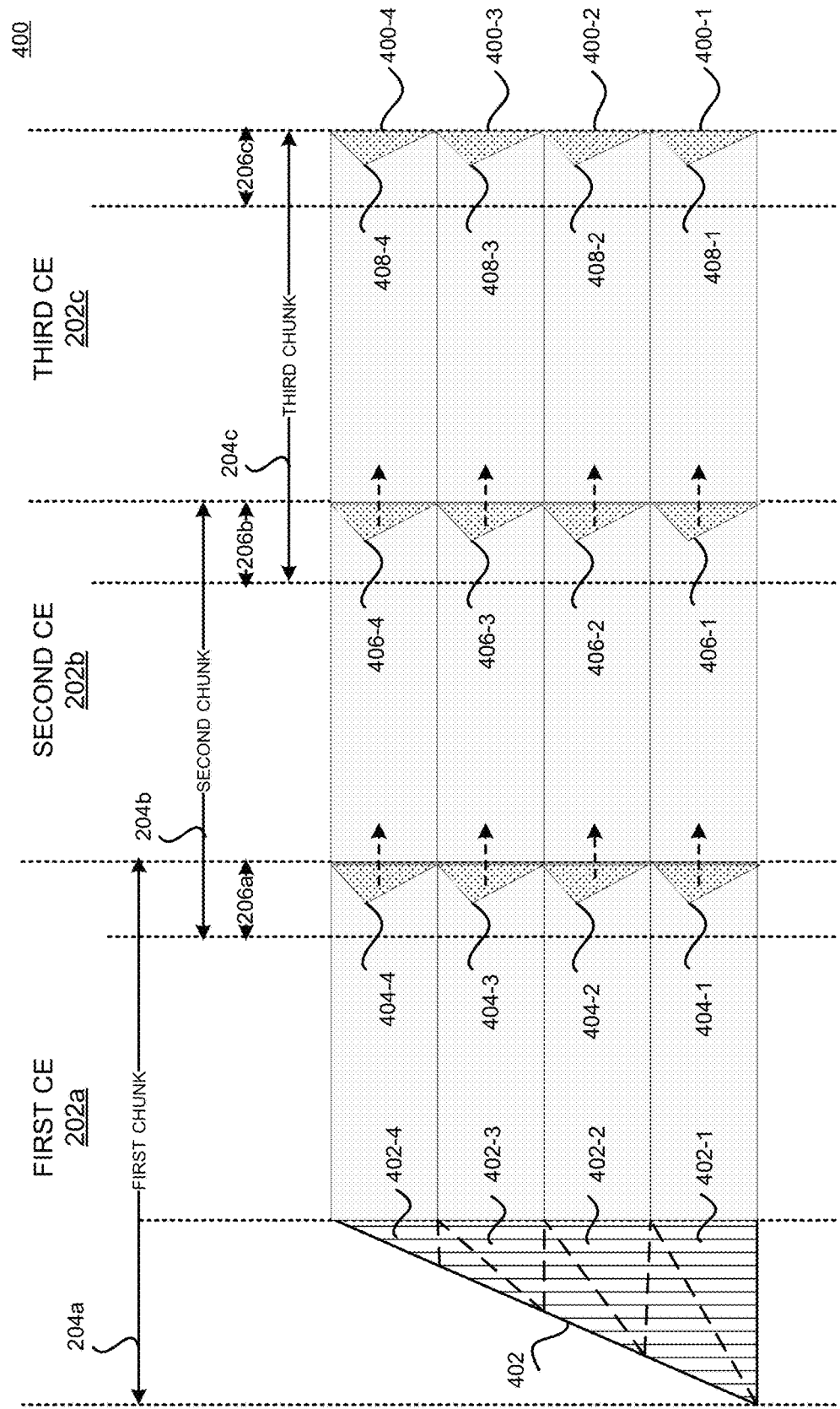
FIG. 4A illustrates a dilated CNN with stacks of convolutional layers configured to use shared states between the CEs, according to the first embodiment.

FIG. 4A illustrates a dilated CNN 400 with stacks of convolutional layers configured to use shared states between the CEs, according to the first embodiment. The dilated CNN 400 may include stacks of dilated CNNs similar to the dilated CNN 100. Each dilated CNN in the stacks 400 can use the N CEs executing in parallel to perform the process 200. As discussed with reference to FIG. 2, the N CEs may include the first CE 202a, second CE 202b, and the third CE 202c.

In the example shown in FIG. 4A, the stacks 400 may include a first dilated CNN 400-1, a second dilated CNN 400-2, a third dilated CNN 400-3, and a fourth dilated CNN 400-4. Each of the dilated CNNs 400-1, 400-2, 400-3, and 400-4 may be similar to the dilated CNN 100 discussed with reference to FIGS. 1A and 1B. The dilated CNN 400-1 may be used to perform convolution operations on an input dataset by executing the first CE 202a, second CE 202b and the third CE 202c in parallel to generate a first output dataset. For example, the input dataset may be received by the input layer 102 and the results will be further processed by the first hidden layer 104, second hidden layer 106, third hidden layer 108 and the output layer 110 by performing the convolution operations at their respective dilation rates to generate the first output dataset. The dilated CNN 400-2 may receive the first output dataset at its input layer 102 and perform convolution operations on the first output dataset by executing the first CE 202a, second CE 202b and the third CE 202c in parallel to generate a second output dataset. Similarly, the dilated CNN 400-3 may receive the second output dataset at its input layer 102 and perform convolution operations on the second output dataset by executing the first CE 202a, second CE 202b and the third CE 202c in parallel to generate a third output dataset. Similarly, the dilated CNN 400-4 may receive the third output dataset at its input layer 102 and perform convolution operations on the third output dataset by executing the first CE 202*a*, second CE 202*b* and the third CE 202*c* in parallel to generate a fourth output dataset. The fourth output dataset may correspond to a output feature map for an inference operation.

According to the first embodiment, for each stack of the convolution layers, each CE may process a last portion of the respective chunk to compute a respective set of shared states to be used by a subsequent CE, as discussed with reference to step 1 in FIG. 2. For example, for the first dilated CNN 400-1, the first CE 202*a* may process the last portion 206*a* of the first chunk 204*a* to generate a set of shared states 404-1 that can be used by the second CE 202*b*. Similarly, the second CE 202*b* may process the last portion 206*b* of the second chunk 204*b* to generate a set of shared states 406-1 that can be used by the third CE 202*c*. The third CE 202*c* may process the last portion 206*c* of the third chunk 204*c* to generate a set of shared states 408-1. The set of shared states 408-1 can be used by the first CE 202*a* for processing the next input dataset for the same inference operation, or can be used internally. For the dilated CNNs 400-2, 400-3, and 400-4, the first CE 202*a* may compute the set of shared states 404-2, 404-3, and 404-4, the second CE 202*b* may compute the set of shared states 406-2, 406-3, and 406-4, and the third CE 202*c* may compute the set of shared states 408-2, 408-3, and the 408-4, respectively. Furthermore, as discussed with reference to FIG. 2, for each stack of the convolution layers, each CE may execute step 2 and step 3 to generate respective portions of the output dataset.

According to the first embodiment, as discussed with reference to FIG. 2, the first CE 202*a* may have to process an initial portion of the input dataset, similar to the first portion 218 for each stack. For example, for each of the dilated CNNs 400-1, 400-2, 400-3, and 400-4, the first CE 202*a* may process first portions 402-1, 402-2, 402-3, and 402-4, respectively. The first portion 402-1 can be the first portion of the first chunk 202*a*, first portion 402-2 can be the first portion of the first output dataset generated by the first stack, first portion 402-3 can be the first portion of the second output dataset generated by the second stack, and the first portion 402-4 can be the first portion of the third output dataset generated by the third stack. Note that, in some systems, instead of having stacks of the dilated CNNs 400-1, 400-2, 400-3, and 400-4, a single dilated CNN with four times depth of the dilated CNN 400-1 can be used. However, having a single dilated CNN with four times convolutional layers of a single stack can involve computing a higher number of initial states as shown by a bigger triangle 402, as compared to multiple smaller number of initial states as shown by smaller triangles 402-1, 402-2, 402-3, and 402-4. Thus, in certain embodiments, stacking multiple dilated CNNs can reduce overall computations as compared to using a single dilated CNN with a large number of convolutional layers.

As discussed with reference to FIG. 4A, the neural network model used by the first CE 202*a* may be different than the one used by the other CEs since the first CE 202*a* may need to compute the initial states 402-1, 402-2, 402-3, and 402-4, whereas the second CE 202*b* and the third CE 202*c* may use the shared states computed by the preceding CEs 202*a* and 202*b*, respectively. Thus, the use of two different models can introduce complexity in the compiler structure and add more computations. Certain embodiments can allow use of the same model by all the CEs, as discussed with reference to FIG. 4B.

Figure 4B:
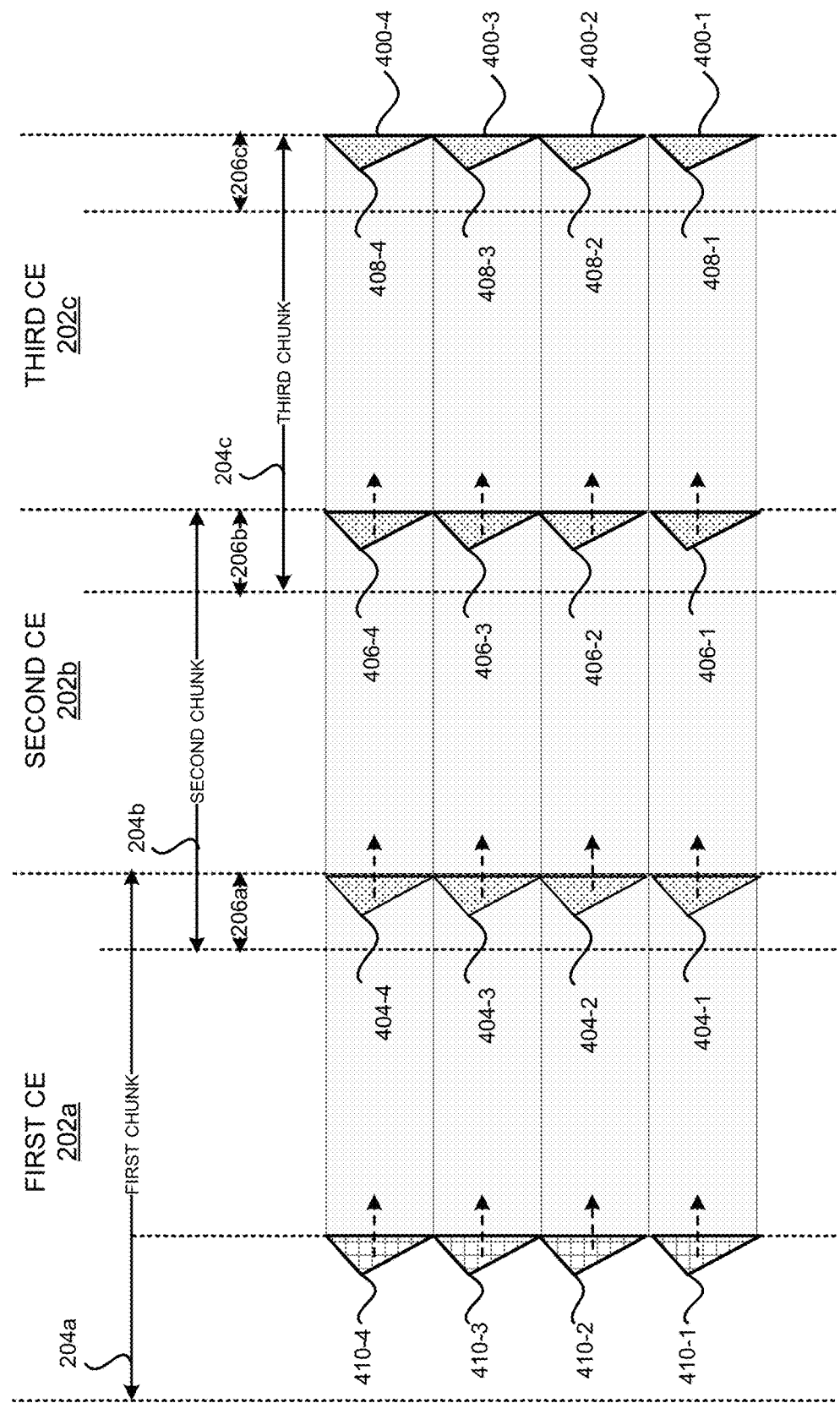
FIG. 4B illustrates use of pre-computed states for the dilated CNN, according to the second embodiment.

FIG. 4B illustrates use of pre-computed states for the dilated CNN 400, according to the second embodiment.

Each stack in the dilated CNN 400 can use the N CEs executing in parallel to perform the process 300. As discussed with reference to FIG. 4A, the dilated CNN 400 may include stacks of convolutional layers that can be executed by the first CE 202*a*, second CE 202*b*, and the third CE 202*c*.

According to the second embodiment, as discussed with reference to FIG. 3, the first CE 202*a* may receive pre-computed states as the shared states so that the same neural network model can be executed by each CE. As shown in FIG. 4B, the first CE may receive pre-computed states 410-1, 410-2, 410-3 and 410-4 when executing the first dilated CNN 400-1, second dilated CNN 400-2, third dilated CNN 400-3, and the fourth dilated CNN 400-4, respectively. For example, the pre-computed states 410-1, 410-2, 410-3 and 410-4 may be similar to the pre-computed states 302 in FIG. 3. As discussed with reference to step 3 in FIG. 3, the first CE 202*a*, second CE 202*b*, and the third CE 202*c* can use their received shared states 410-1 to 410-4, 404-1 to 404-4, and 406-1 to 406-4 for each stack, respectively, to compute a respective portion of the output dataset in parallel. The compiler may generate an instruction that can be executed to obtain the pre-computed states 410-1, 410-2, 410-3 and 410-4 to be used by the first CE 202*a* for each stack, respectively. In various examples, the pre-computed states may be randomly generated, have static or known values, or can be generated from a first portion of the first chunk as discussed with reference to FIG. 3.

Embodiments discussed with reference to previous figures can eliminate the need to re-compute the shared states by caching the shared states on the local CE, and sharing the states using a high performance inter-CE bus instead of the memory hierarchy. Thus, the system performance can be improved by eliminating memory bandwidth bottlenecks. Additionally, the pre-computed states for the first CE can allow each CE, for each stack, to execute the same set of instructions that are generated based on the same neural network model, which can reduce compiler complexity. An example CE is discussed with reference to FIGS. 5A, 5B and 5C.

Figure 5A:
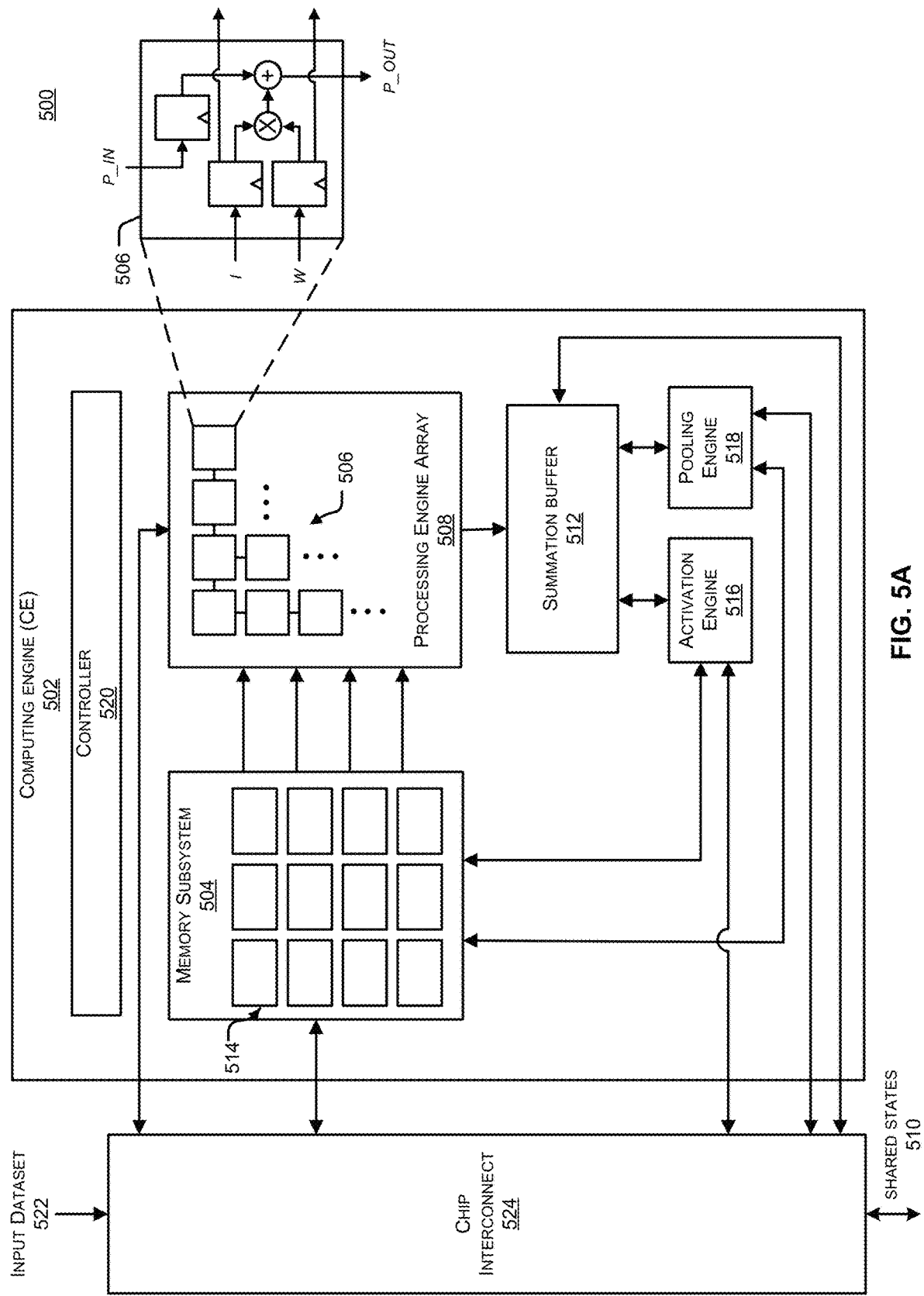

FIG. 5A is a block diagram 500 illustrating an example of an integrated circuit device that can be configured to perform various types of convolution operations, including normal convolutions and dilated convolution operations. The integrated circuit device can include a CE 502 which may represent any of the N CEs discussed with reference to FIGS. 1A, 1B, 2, 3, 4A and 4B. In certain examples, the CE 502 can alternatively be called an accelerator. In various examples, the CE 502, for a set of input data (e.g., input dataset 522), can execute computations using a processing engine array 508, an activation engine 516, and/or a pooling engine 518. The CE 502 can use a memory subsystem 504 to store the input dataset 522 to be processed by the processing engine array 508, and processing results. A summation buffer 512 can be used to store partial results output by the processing engine array 508. The input dataset 522 can be part of an input feature map comprising N chunks as discussed with reference to previous figures. The CE 502 can also include a controller 520 to control operations of the processing engine array 508, activation engine 516 and the pooling engine 518. In some examples, the CE 502 may be an integrated circuit component of a processor, such as a neural network processor, or an acceleration engine. The acceleration engine may have other integrated circuit components, including additional computing engines. For example, the acceleration engine may include N CEs comprising the first CE 202*a*, second CE 202*b*, and the third CE 202c. Each of the first CE 202a, second CE 202b, and the third CE 202c can be similar to the CE 502.

According to certain embodiments, the memory subsystem 504 may be configured to store a set of states computed by the CE 502 when processing an overlapping portion of the input dataset 522 that is shared with a subsequent CE. The set of states may include shared states 510 that can be transmitted to the subsequent CE via the chip interconnect 524. In certain examples, the set of states comprising the shared states 510 can be stored in one or more memory banks 514. The overlapping portion may be similar to the overlapping portions 206a, 206b, or 206c, as discussed with reference to FIGS. 2-3. For example, the memory subsystem 504 in the first CE 202a may be used to store the set of states 210a comprising the shared states 208a, the memory subsystem 504 in the second CE 202b may be used to store the set of states 210b comprising the shared states 208b, and the memory subsystem 504 in the third CE 202c may be used to store the set of states 210c comprising the shared states 208c. The shared states 208a, 208b, or 208c can be transmitted or received via the respective shared states 510 for each CE. The memory subsystem 504 can also be used to store the pre-computed states 302 as discussed with reference to FIG. 3, or the pre-computed states 410-1, 410-2, 410-3 and 410-4 as discussed with reference to FIG. 4B. In certain examples, the pre-computed states may be received as part of the input dataset 522 or the shared states 510. The set of states or the pre-computed states can optionally be stored in the summation buffer 512, or can be stored in an independent memory component internal to the CE 502 (not shown). The memory subsystem 504 can store the set of states, even after the shared states 510 have been transmitted or copied to a subsequent CE, to be used for generating a respective portion of the output dataset.

In various implementations, the memory subsystem 504 can include multiple memory banks 514. In these implementations, each memory bank 514 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 514. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 504 can permit simultaneous access to the read or write channels of multiple memory banks. As another example, the memory subsystem 504 can include arbitration logic such that arbitration between, for example, the outputs of multiple memory banks 514 can result in more than one memory bank's output being used. In these and other examples, though globally managed by the memory subsystem 504, each memory bank can be operated independently of any other.

Having the memory banks 514 be independently accessible can increase the efficiency of the CE 502. For example, values can be simultaneously read and provided to each row of the processing engine array 508, so that the entire processing engine array 508 can be in use in one clock cycle. As another example, the memory banks 514 can be read at the same time while results computed by the processing engine array 508 are written to the memory subsystem 504. In contrast, a single memory may be able to service only one read or write at a time. With a single memory, multiple clock cycles can be required, for example, to read input data for each row of the processing engine array 508 before the processing engine array 508 can be started.

In various implementations, the memory subsystem 504 can be configured to simultaneously service multiple clients, including the processing engine array 508, the activation engine 516, the pooling engine 518, and any external clients that access the memory subsystem 504 over chip interconnect 524. In some implementations, being able to service multiple clients can mean that the memory subsystem 504 has at least as many memory banks as there are clients. In some cases, each row of the processing engine array 508 can count as a separate client. In some cases, each column of the processing engine array 508 can output a result, such that each column can count as a separate write client. In some cases, output from the processing engine array 508 can be written into the memory banks 514 that can then subsequently provide input data for the processing engine array 508. As another example, the activation engine 516 and the pooling engine 518 can include multiple execution channels, each of which can be separate memory clients. The memory banks 514 can be implemented, for example, using static random access memory (SRAM) or other suitable memory.

In various implementations, the memory subsystem 504 can include control logic. The control logic can, for example, keep track of the address spaces of each of the memory banks 514, identify the memory banks 514 to read from or write to, and/or move data between the memory banks 514. In some implementations, the memory banks 514 can be hardwired to particular clients. For example, a set of memory banks 514 can be hard-wired to provide values to the rows of the processing engine array 508, with one memory bank servicing each row. As another example, a set of memory banks can be hard wired to receive values from columns of the processing engine array 508, with one memory bank receiving data for each column.

In certain examples, the set of states including the shared states 510 may be received from the columns of the processing engine array 508, for example, when processing the overlapping portions. The shared states 510 may be stored in a portion of the memory banks 514 for transmission to a subsequent CE over the chip interconnect 524. For example, a particular portion of the memory banks 514 storing the shared states 510 can be disabled to be overwritten, or become read only until the shared states 510 have been transmitted to the next CE and step 3 has been executed by the CE 502. The controller 520 can identify the shared states 510 from the set of states stored in the memory subsystem 504 to be transmitted to a subsequent CE by parsing certain parameters from the appropriate instruction.

The processing engine array 508 is the computation matrix of the example CE 502. The processing engine array 508 can, for example, execute parallel integration, convolution, correlation, and/or matrix multiplication, among other things. The processing engine array 508 may include multiple processing engines 506, arranged in rows and columns, such that results output by one processing engine 506 can be input directly into another processing engine 506. Processing engines 506 that are not on the outside edges of the processing engine array 508 thus can receive data to operate on from other processing engines 506, rather than from the memory subsystem 504.

In various examples, the processing engine array 508 may use systolic execution, in which data arrives at each processing engine 506 from different directions at regular intervals. In some examples, input data can flow into the processing engine array 508 from the left and weight values can be loaded at the top. In some examples weights and input data can flow from the left and partial sums can flow from top to bottom. In these and other examples, a multiply-and-accumulate operation moves through the processing engine array 508 as a diagonal wave front, with data moving to the right and down across the array. Control signals can be input at the left at the same time as weights, and can flow across and down along with the computation.

In various implementations, the number of columns in the processing engine array 508 may determine the computational capacity of the processing engine array 508, and the number of rows may determine the required memory bandwidth for achieving maximum utilization of the processing engine array 508. The processing engine array 508 can have, for example, 64 columns and 128 rows, or some other number of columns and rows. In certain embodiments, different portions of the assigned chunk to be processed by the CE 502 in steps 1, 2 and 3 can be based on the computational capacity of the processing engine array 508, memory bandwidth supported by the memory subsystem 504, or transmission speed of the chip interconnect 524, among others.

An example of a processing engine 506 is illustrated in FIG. 5A in an inset diagram. As illustrated by this example, the processing engine 506 may include a multiplier-accumulator circuit. Inputs from the left can include, for example, input data i and a weight value w, where the input data is a value taken from either input dataset 522 or a set of intermediate results, and the weight value is from a set of weight values that connect one layer of the neural network to the next. The input dataset 522 can be, for example, an image being submitted for identification or object recognition, an audio clip being provided for speech recognition, a string of text for natural language processing or machine translation, or the current state of a game requiring analysis to determine a next move, among other things. The shared states 510 computed by a preceding CE, or the pre-computed states may be received via the chip interconnect 524 and stored in the memory subsystem 504 to be processed by the processing engine array 508 for performing the convolution operations. In some examples, the input data and the weight value are output to the right from one processing engine 506, for input to the next processing engine 506.

In the illustrated example, an input from above can include a partial sum, p_in, provided either from another processing engine 506 or from a previous round of computation by the processing engine array 508. When starting a computation for a new input dataset, the top row of the processing engine array 508 can receive a fixed value for p_in, such as zero. As illustrated by this example, i and w are multiplied together and the result is summed with p_in to produce a new partial sum, p_out, which can be input into another processing engine 506. Various other implementations of the processing engine 506 are possible.

Outputs from the last row in the processing engine array 508 can be temporarily stored in the summation buffer 512. The results can be intermediate results, which can be written to the memory banks 514 to be provided to the processing engine array 508 for additional computation. Alternatively, the results can be final results, which, once written to the memory banks 514 can be read from the memory subsystem 504 over the chip interconnect 524, to be output by the system. For example, the intermediate results can include intermediate states computed by the first hidden layer 104, second hidden layer 106, or the third hidden layer 108 in FIGS. 1A and 1B. In certain embodiments, the intermediate states may include the shared states 510 to be shared with another CE. These shared states 510 can be stored in a particular portion of the memory banks 514 in step 1 to be read in step 2 for transmission to another CE via the chip interconnect 524. The shared states 510 can also be used by the CE 502 to generate its portion of the output feature map. For example, the shared states 510 can be provided to the processing engine array 508 for additional computation by the output layer 110 to generate the output dataset elements.

In some implementations, the CE 502 may include an activation engine 516. In these implementations, the activation engine 516 can combine the results from the processing engine array 508 into one or more output activations. For example, for a convolutional neural network, convolutions from multiple channels can be summed to produce an output activation for a single channel. In other examples, accumulating results from one or more columns in the processing engine array 508 may be needed to produce an output activation for a single node in the neural network. In some examples, the activation engine 516 can be bypassed.

In various examples, the activation engine 516 can include multiple separate execution channels. In these examples, the execution channels can correspond to the columns of the processing engine array 508, and can perform an operation on the outputs of a column, the result of which can be stored in the memory subsystem 504. In these examples, the activation engine 516 may be able to perform between 1 and n parallel computations, where n is equal to the number of columns in the processing engine array 508. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the CE 502 can include a pooling engine 518. Pooling is the combining of outputs of the columns of the processing engine array 508. Combining can include, for example, computing a maximum value, a minimum value, an average value, a median value, a summation, a multiplication, or another logical or mathematical combination. In various examples, the pooling engine 518 can include multiple execution channels that can operate on values from corresponding columns of the processing engine array 508. In these examples, the pooling engine 518 may be able to perform between 1 and n parallel computations, where n is equal to the number of columns in the processing engine array 508. In various examples, execution channels of the pooling engine 518 can operate in parallel and/or simultaneously. In some examples, the pooling engine 518 can be bypassed.

Herein, the activation engine 516 and the pooling engine 518 may be referred to collectively as execution engines. The processing engine array 508 is another example of an execution engine. Another example of an execution engine is a Direct Memory Access (DMA) engine, which may be located outside the CE 502.

In some examples, the CE 502 can implement a neural network processing engine. In these examples, the CE 502, for the input dataset 522, can execute a neural network to perform a task for which the neural network was trained. Executing a neural network on a set of input data can be referred to as inference or performing inference. As an example, the neural network can be a dilated CNN similar to the dilated CNN 100 in FIGS. 1A and 1B, and the CE 502 can execute the dilated CNN to perform inference. In certain embodiments, the neural network can include stacks of dilated CNNs, similar to the stacks 400, as discussed with reference to FIGS. 4A and 4B. The stacks of dilated CNNs may be used to perform multiple iterations of inference operations to improve the inference quality.

The input dataset 522 can arrive over the chip interconnect 524. The chip interconnect 524 can provide a communication fabric to connect the CE 502 with other components of the acceleration engine, such as a DMA engine that can obtain the input dataset 522 from an Input/Output (I/O) device, a storage drive, or a network interface, and other CEs for transmitting or receiving shared states 510. The input dataset 522 can be, for example, one-dimensional data, such as a character string or a numerical sequence, or two-dimensional data, such as an array of pixel values for an image or frequency and amplitude values over time for an audio signal. In some examples, the input dataset 522 can be three-dimensional, as may be the case with, for example, the situational information used by a self-driving car or virtual reality data. In some implementations, the memory subsystem 504 can include a separate buffer for the input dataset 522. In some implementations, the input dataset 522 can be stored in the memory banks 514 when the CE 502 receives the input dataset 522. In the first embodiment, the input dataset 522 may include the first portion 218, middle portion 212a, and the last portion 206a of the first chunk 204a via the chip interconnect 524 for processing by the CE 502, as discussed with reference to FIG. 2. In the second embodiment, the input dataset 522 may include the pre-computed states 302, middle portion 212a, and the last portion 206a for processing by the CE 502, as discussed with reference to FIG. 3. The middle portion 212b and the last portion 206b of the second chunk 204b may be received by a second CE as part of its input dataset 522, and the middle portion 212c and the last portion 206c of the third chunk 204c may be received by a third CE in the acceleration engine as part of its input dataset 522. As discussed previously, instead of the receiving the overlapping first portion 206a by the second CE 202b or the overlapping first portion 206b by the third CE 202c, the second CE 202a and the third CE 202c may receive the shared states 208b and 208c computed by the first CE 202a and the second CE 202b, respectively, using their respective overlapping portions.

The weights for the neural network can be stored in the memory subsystem 504, along with input data 522 on which the neural network can operate. The addresses of the weights and the input data 522 in the memory subsystem 504 can be based on or mapped to the coordinates of the weights and the input data 522 in, respectively, a weight data array and an input data array, which can allow the weight and the input data to be retrieved based on the addresses derived from their coordinates. The neural network can also include instructions, which can be executed by the controller 520 to control the processing engine array 508 to perform various computations on the weights and the input data. The instructions can be generated by a compiler and can also be stored in the memory subsystem 504, in the memory banks 514 or in a separate instruction buffer. The processing engine array 508 can output intermediate results, which may represent the outputs of individual layers of the neural network. For example, the intermediate results may represent the outputs of the first hidden layer 104, second hidden layer 106, or the third hidden layer 108 in FIGS. 1A and 1B. In some cases, the activation engine 516 and/or pooling engine 518 may be enabled for computations called for by certain layers of the neural network.

The CE 502 can store the intermediate results in the memory subsystem 504 for inputting into the processing engine array 508 to compute results for the next layer of the neural network (e.g., the dilated CNN 100 or the stacks 400 of dilated CNNs). In certain embodiments, the CE 502 can store the intermediate results from processing the overlapping portion (for example, the last portion of its assigned chunk) in a particular portion of the memory subsystem 504. The processing engine array 508 can further provide final results from a last layer of the neural network as the output dataset. The final results can be stored in the memory subsystem 504 and then be copied out to a host processor memory or to another location. For example, the final results can correspond to a portion of the output feature map associated with the CE 502 that may be generated by the processing engine array 508 from the output layer 110 of the dilated CNN 100, or the stacks 400 of dilated CNNs.

Figure 5B:
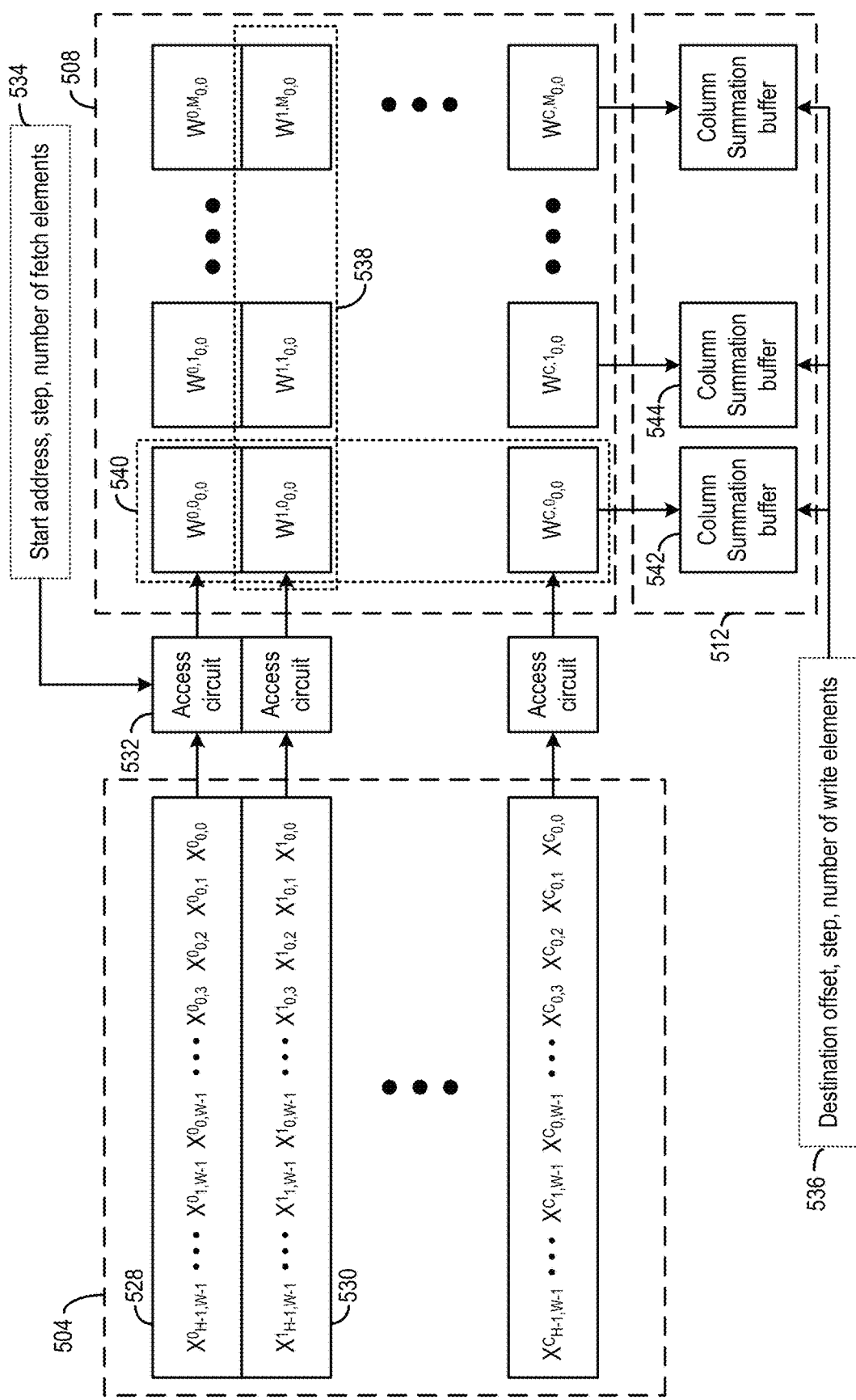

FIG. 5B and FIG. 5C illustrate examples of operations of the CE 502. As shown in FIG. 5B, the memory subsystem 504 can be organized into multiple rows, such as memory rows 528, 530, etc. Each memory row can store the input data elements of a particular input channel. A memory access circuit (e.g., memory access circuit 532) can be controlled to fetch the input data elements to the processing engine array 508 sequentially based on a set of memory fetch parameters 534 including a start address, step, and number of elements. The start address parameter can define the location of the first input data element to be read from the memory row, the step parameter can define a number of input data elements skipped between the fetched input data elements, whereas the number of fetch elements parameter can define a total number of input data elements to be fetched. For dilated CNNs, the step parameter may be based on the dilation rate. As the input data elements are stored in a contiguous space, the access circuit 532 can determine the addresses of the input data elements to be fetched and update a counter based on the step for each stack. For example, the access circuit 532 can start fetching the first input data element from the start address, add an address offset based on the step to the start address to fetch the next input data element while skipping a number of input data elements, and repeat until the number of fetched elements is reached. Thus, in certain embodiments, based on the dilation rate, appropriate number of input data elements or intermediate states can be skipped for generating the next set of states or output dataset elements for each stack. As to be described in more detail below, the memory fetch parameters 534 can be included in an instruction to compute a set of partial sums. The instruction can be generated by a compiler and parsed by the controller 520 to extract the memory fetch parameters 534. The controller 520 can then control the fetching of input data elements from the memory subsystem 504 based on the extracted memory fetch parameters 534. As to be described in detail below, the start address, step, and number of elements parameters can be configured to support different types of convolution operations, such as a normal convolution operation, a dilated convolution operation, etc.

The processing engines 506 of the processing engine array 508 can be organized into rows, such as row 538, and columns, such as column 540. Each row of the processing engines 506 is mapped to an input channel and can receive input data elements sequentially from a memory row of the memory subsystem 504 mapped to the input channel, whereas each column of the processing engines 506 can be mapped to an output channel. Input data elements are stored in a contiguous address space and follow an order based on their coordinates in the input data array. Each processing engine 506 can store a weight data element for an input channel and an output channel the processing engine is mapped to. Referring to FIG. 5A and FIG. 5B, a processing engine 506 within an engine can receive input data elements of an input channel (e.g., input data i of FIG. 5A), multiply it with the stored weight (e.g., weight data w of FIG. 5A) to generate a product, add the product to the input partial sum p_in to generate the new partial sum p_out, and pass the new partial sum p_out to the processing engine 506 below of the same column. The bottom processing engine 506 of a column can generate a partial sum representing a sum of products between the weight data elements stored in the column of processing engines 506 and the input data elements of different input channels received from the memory subsystem 504.

In a case where memory fetch parameters 534 indicate that the starting address is at the rightmost input data element of each row, a step of one (which can indicate skipping in this example), and a certain number of input data elements are to be fetched, in a first iteration the column 540 of the processing engines 506 can generate a first partial sum based on the stored weight data elements and the input data elements provided by the memory subsystem 504 as follows:

$$\text{First partial sum} = X^0_{0,0} \times W^{0,0}_{0,0} + X^0_{0,0} \times W^{1,0}_{0,0} + \ldots + X^c_{0,0} \times W^{c,0}_{0,0} \quad \text{(Equation 1)}$$

In a second iteration, the column 540 of the processing engines 506 can generate a second partial sum based on the stored weight data elements and the input data elements provided by the memory subsystem 504 as follows:

$$\text{Second partial sum} = X^0_{0,1} \times W^{0,0}_{0,0} + X^0_{0,1} \times W^{1,0}_{0,0} + \ldots + ^c_{0,1} \times W^{c,0}_{0,0} \quad \text{(Equation 2)}$$

Each column of the processing engines 506 can provide the partial sums generated in the iterations to a column summation buffer, such as column summation buffers 542, 544, etc., both of which can be part of the summation buffer 512. The partial sums can be generated based on the weight data elements at the same coordinates of different filter arrays associated with different input and output channels, and the partial sums corresponding to different output data elements. Referring to FIG. 5C, each of the column summation buffers 542 and 544 may include a number of entries, such as $E_{0,0}$, $E_{0,1}$, $E_{0,2}$, etc. Each entry can have coordinates mapped to coordinates of an output tile, which can represent a region of an output array. Each entry has an adder (not shown in FIG. 5C) which can allow the entry to add a received partial sum to the stored partial sum to generate an accumulated partial sum. The entry can then store the accumulated partial sum.

The operations at the column summation buffers 542 and 544 can be controlled by a set of buffer write parameters 536 including a destination offset, a step, and a number of write elements. The destination offset parameter can indicate the entry to which the first partial sum (of the first iteration) is to be added to. The step parameter can indicate a number of entries to be skipped between neighboring entries that receive partial sums. The step parameter can correspond to a gap between non-zero input data elements that overlap with a weight data element when the weight data array is at different stride locations. Moreover, the number of write elements indicate a number of partial sums to be added to entries of the summation buffer starting from the start address, with neighboring entries separated based on the step parameter as described above.

As an illustrative example, in a case where the destination offset is 2 and the step is 1, the first partial sum from the column 540 can be stored at entry $E_{0,2}$, the second partial sum can be stored at $E_{0,3}$, the third partial sum can be stored at $E_{0,4}$, etc., until a number of partial sums specified by the number of write elements is stored. As to be described in more detail below, the buffer write parameters 536 can be included in the instruction to compute the set of partial sums. The instruction can be parsed by the controller 520 to extract the buffer write parameters 536. The controller 520 can then control the operations of the summation buffers based on the extracted buffer write parameters 536. As to be described below, the buffer write parameters 536 can be configured to support convolution operations.

After computing the partial sums from a first set of weight data elements (same coordinates in their respective filter arrays but of different input and output channels), the processing engine array 508 can load a new set of weight data elements from different coordinates and repeat the partial sums computations. The new partial sums can be added to the partial sums stored in the summation buffer 512 computed from the first set of weight data elements. The computations and accumulations of the partial sums can continue for the rest of the weight data elements to generate the data elements of the output dataset. After the data elements of the output dataset are generated, the summation buffer 512 can provide the data elements of the output dataset to the activation engine 516 and/or the pooling engine 518 for post-processing, and the post-processed output data elements can be stored in the memory subsystem 504. From the memory subsystem 504, the post-processed output data can be sent to the chip interconnect 524 and/or fetched to the processing engine array 508 as input data for a subsequent neural network layer processing. In certain examples, the post-processed output data can be part of an output dataset for a first stack in the stacks of dilated CNNs and can be fetched to the processing engine array 508 as part of the input dataset for a second stack for the next iteration.

Figure 6:
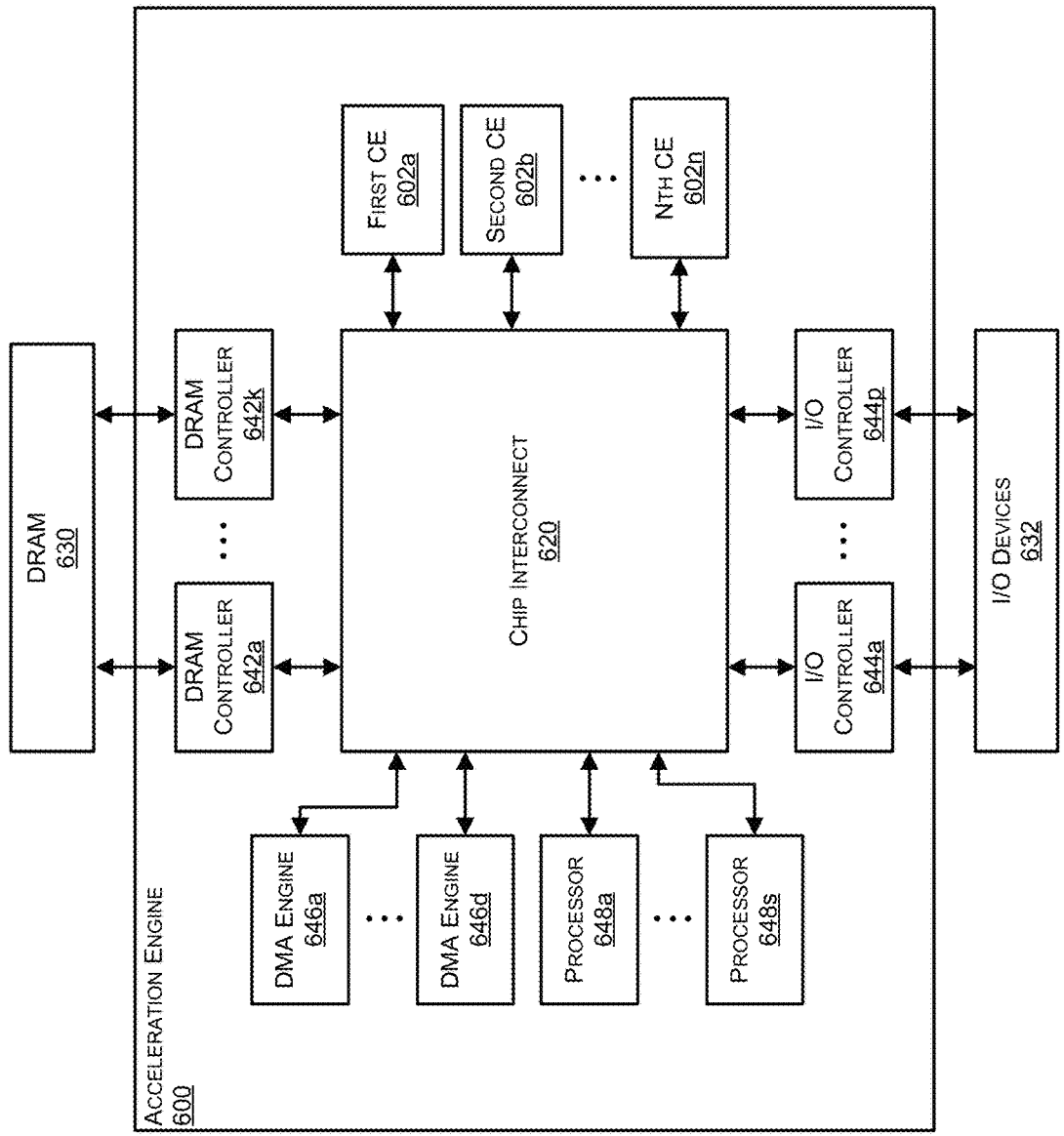
FIG. 6 includes a block diagram that illustrates an example of an acceleration engine.

FIG. 6 includes a block diagram that illustrates an example of an acceleration engine 600. The acceleration engine 600 is an example of an integrated circuit that can include N CEs comprising a first CE 602a, a second CE 602b and an Nth CE 602n. Each of the CEs 602a-602n may be similar to the CE 502 as discussed with reference to FIGS. 5A-5C.

In the example of FIG. 6, the acceleration engine 600 includes multiple CEs 602a-602n, each of which can perform a set of operations. In various examples, the CEs 602a-602n can be used as accelerators for particular types of operations, so that the CEs 602a-602n can perform the operations much faster than when similar operations are performed by a general purpose processor. In various examples, to perform a set of operations, input data on which the operations are to be performed must first be moved into the CEs 602a-602n. Additionally, in some cases, program code is also moved into the CEs 602a-602n, which programs the operations that the CEs 602a-602n will perform on the data. Examples of CEs that can be included in the acceleration engine 600 may include graphics accelerators, floating point accelerators, neural network accelerators, and others. In various examples, the CEs 602a-602n can each be the same (e.g., each of the CEs 602a-602n is a graphics accelerator) or can be different (e.g., the CEs 602a-602n include a graphics accelerator, a floating point accelerator, and a neural network accelerator).

The example acceleration engine 600 may further include DRAM controllers 642a-642k for communicating with an external memory. The external memory may be implemented, in this example, using DRAM 630. In the illustrated example, the acceleration engine 600 may also include k DRAM controllers 642a-642k, each of which may be able to communicate with an independent set of banks of DRAM. In other examples, other types of RAM technology can be used for the external memory. The DRAM controllers 642a-642k can also be referred to as memory controllers.

In various examples, input data and/or program code for the CEs 602a-602n can be stored in the DRAM 630. Different programs can cause the CEs 602a-602n to perform different operations. For example, when one of the CEs is a neural network accelerator, one program can configure the neural network accelerator to perform speech recognition while another program can configure the neural network accelerator to perform image recognition. In various examples, different CEs 602a-602n can be programmed with different programs, so that each performs a different set of operations. In various examples, processors 648a-648s can be used to manage moving of program code from the DRAM 630 to the CEs 602a-602n.

The example acceleration engine 600 may further include I/O controllers 644a-644p for communicating with I/O devices 632 in the system. The acceleration engine 600 can communicate with I/O devices over, for example, a processor bus. In some examples, the processor bus can be implemented using Peripheral Component Interconnect (PCI) and/or a variation of the PCI bus protocol. The processor bus can connect the acceleration engine 600 to I/O devices such as, for example, input and output devices, memory controllers, storage devices, and/or network interface cards, among other things. In some examples, the I/O controllers 644-644p can enable the acceleration engine 600 to act as an I/O device for a host processor. For example, the acceleration engine 600 can be the recipient of input data from the host processor, and a command indicating an operation to be performed on the input data (e.g., a particular computation or analysis). In the illustrated example, the acceleration engine 600 may include p I/O controllers 644a-644p, each of which may include a separate root complex and may communicate with a separate set of I/O devices 632. In other examples, other standardized bus protocols, such as Ultra Path Interconnect (UPI) can be used for the host bus. In other examples, a proprietary bus protocol can be used.

Movement of the data in the acceleration engine 600 can be managed by one or more processors 648a-648s, which can also be referred to as data management processors. In the example of FIG. 6, the acceleration engine 600 may include s processors 648a-648s incorporated into the device (e.g., on the same silicon die). In other examples, the processors 648a-648s can be external to the acceleration engine 600 (e.g., on a different die and/or in a different package). In some examples, the processors 648a-648s can manage the movement of data from the I/O devices 632 to the CEs 602a-602n or the DRAM 630. For example, the input dataset may be located at an I/O device 632 or in processor memory, and the processors 648a-648s can move the input dataset from the I/O device 632 or processor memory into a CE (e.g., as the input dataset 422 in the CE 402) or into the DRAM 630. As another example, program code for the CEs 602a-602n may be located on an I/O device 632 or in processor memory.

The example acceleration engine 600 may further include DMA engines 646a-646d that can move data between the CEs 602a-602n, DRAM controllers 642a-642k, and the I/O controllers 644a-644p. In the illustrated example, the acceleration engine 600 may include d DMA engines 646a-646d. In some implementations, the DMA engines 646a-646d can be assigned to specific tasks, such as moving data from the DRAM controllers 642a-642d to the CEs 602a-602n, or moving data between the I/O controllers 644a-644p and the CEs 602a-602n. These tasks can be assigned, for example, by enqueueing descriptors with the DMA engines 646a-646d, where a descriptor identifies an address for a block of data and an operation (e.g., a read or a write) to perform. A descriptor, for example, can direct a DMA engine to instruct a DMA controller to read a block of data from DRAM 630. A descriptor can, as a further example, instruct the DMA engine to write data, read by the DMA controller, to a CE. Further descriptors can be used to move data from a CE to DRAM 630.

In various examples, each of the processors 648a-648s can be responsible for managing the data movement for a different CE. In some examples, a processor may manage the data movement for more than one CE. Similarly, in various examples, each of the processors 648a-648s can be assigned to one or more DMA engines 646a-646d. In these and other examples, associations between the processors 648a-648s, CEs 602a-602n, and the DMA engines 646a-646d can be determined by program code being executed by each respective processor.

In the example acceleration engine 600, the various components can communicate over a chip interconnect 620. The chip interconnect 620 may primarily include wiring for routing data between the components of the acceleration engine 600. In some examples, the chip interconnect 620 can include a minimal amount of logic, such as multiplexors to control the direction of data, flip-flops for handling clock domain crossings, and timing logic. The chip interconnect 620 can include the chip interconnect 524 of FIG. 5A. In some implementations, the chip interconnect 620 may be based on a PCI based protocol.

Figure 7:
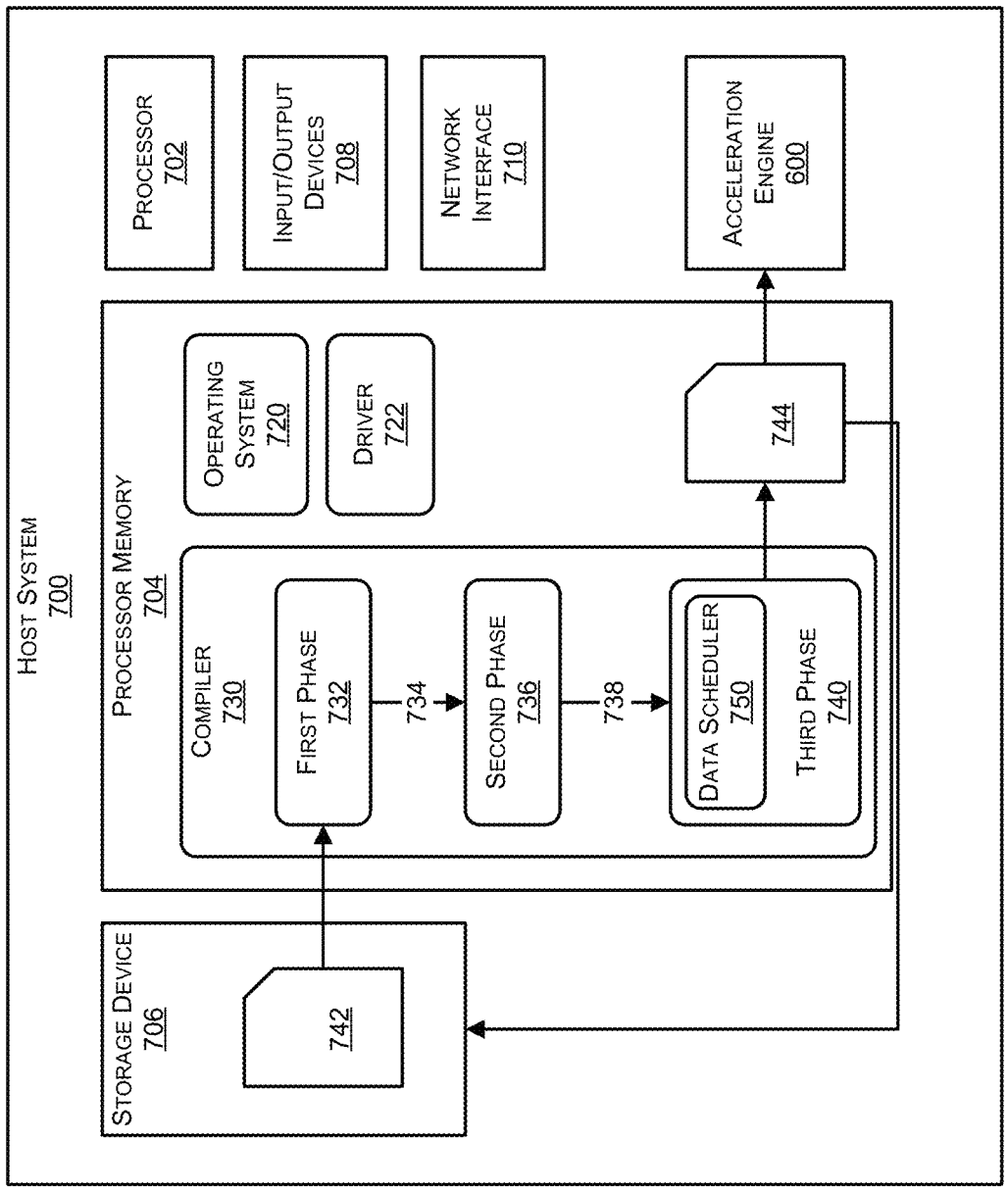
FIG. 7 includes a block diagram that illustrates an example of a host system.

FIG. 7 includes a block diagram illustrating an example of a host system 700 on which a compiler 730, such as is described herein, can run. The illustrated host system 700 is an example of a computing device, and includes a processor 702, a processor memory 704, at least one storage device 706, various Input/Output (I/O) devices 708, and at least one network interface 710. In the example of FIG. 7, the host system 700 may also include the acceleration engine 600 of FIG. 6 to accelerate certain operations or computations performed by the host system 700. In various examples, the host system 700 can be implemented as a server in a data center, a desktop computer, a laptop computer, a tablet computer, or a smartphone, among other examples. In some examples, operations or components discussed below as performed or included in the host system 700 can be performed or included in other computer devices. For example, the compiler 730 can execute on the host system 700 while the acceleration engine 600 may be located at a different host system.

The processor 702 is an integrated circuit device that can execute program code, in the form of instructions. The program code can be for various software applications or tools, such as an operating system 720 or the illustrated compiler 730. While the processor 702 is executing a program, the instructions for the program can be stored in the processor memory 704. The instructions can also be stored elsewhere, such as on the storage device 706, and can be loaded into the processor memory 704 when needed by the processor 702. The processor 702 can also use the processor memory 704 for temporary storage of other data on which the processor 702 is operating. In various examples, the processor memory 704 is a volatile memory type, such as a type of Random Access Memory, though non-volatile memory types can, alternatively or additionally, be used for the processor memory 704.

The storage device 706 is an example of a device that can include non-volatile memory. For example, the storage device 706 can be a magnetic disk drive, a solid state drive, or an optical drive, among other examples. The storage device 706 can further be non-transitory, such that program code and other data stored on the storage device 706 remains present when the storage device 706 is not powered on.

The storage device 706 is one example of a peripheral device, which are components that can be coupled to the host system 700 to add functionality to the host system 700. Other examples of peripheral devices include the Input/Output devices 708 and the network interface 710. The Input/Output devices 708 can include user input and output devices, such as keyboards, mice, touch screens, microphones, display screens, speakers, printers, and scanners, among other examples. The network interface 710, which can be implemented using a network interface card, can provide access to one or more networks. The network interface 710 can include, for example, a physical port for connecting a network cable and/or wireless antennas for communicating with Wi-Fi and/or cellular networks. The network interface 710 can also be described as an I/O device.

The acceleration engine 600 can also be another type of peripheral device or I/O device. The acceleration engine 600 may be a device that can be purpose built to perform certain operations that can be performed by the processor 702, but can be performed faster by the acceleration engine 600. For example, the acceleration engine 600 can be a neural network accelerator, and, as such, may be able to perform the large scale, parallel computations of a neural network more efficiently than when the computations are performed by the processor 702. As another example, the acceleration engine 600 can be a graphics processing unit (GPU), and may be optimized to perform the computations needed for graphics rendering. Other examples of devices that can be implemented by the acceleration engine 600 include cryptographic accelerators, compression and decompression accelerators, 3-D accelerators, regular expression accelerators, security accelerators, and others.

In various examples, the acceleration engine 600 can execute program code to perform certain operations. For example, when the acceleration engine 600 is a neural network accelerator, the acceleration engine 600 can be programmed to execute a particular dilated neural network (similar to the dilated CNN 100 or the dilated CNN 400), such as one that performs speech synthesis, object detection or one that performs machine translation. As a further example, to support the execution of a neural network, the acceleration engine 600 can be programed to perform operations such as copying data for the neural network from processor memory 704 (for example) into the acceleration engine 600, copying input data for the neural network from processor memory 704 into the acceleration engine 600, and/or copying results from the acceleration engine 600 into the processor memory 704, among other examples.

To generate program code for the acceleration engine 600, in various examples, the host system 700 can execute the compiler 730. Compilers, in general, are software programs that translate program code written in a human-readable language into a format (e.g., machine instructions) that can be read and processed by an integrated circuit device. In the example of FIG. 7, the acceleration engine 600 is a neural network accelerator and the compiler 730 is for compiling a neural network model into instructions to be executed by the acceleration engine 600. When the acceleration engine 600 implements a different type of accelerator, another compiler can be used.

The compiler 730 can be activated, for example, when the operating system 720 receives keyboard, mouse, touchscreen, voice commands, or other inputs from the Input/Output devices 708. The inputs can further include parameters for the compiler 730, such as the input code 742 to compile and configuration options for the compilation process. Once the compiler 730 is activated, the processor 702 can load the instructions for the compiler 730 into the processor memory 704, and can execute the instructions.

In the example of FIG. 7, the compiler 730 may include a first phase 732, a second phase 736, and a third phase 740, which each perform different operations to produce compiled code 744. In other examples, the compiler 730 can combine the operations of the first phase 732, second phase 736, and/or third phase 740 into fewer phases, or can divide the operations of one of the phases into multiple phases.

The first phase 732 can receive and process input code 742. The input code 742 can describe a program in a high-level programming language, such as Java, C++, or Tensorflow, among many other examples. The input code 742 can describe, for example, steps to perform object detection, speech synthesis, speech recognition, machine translation, or other operations. The input code 742 can be obtained, for example, from the storage device 706. Alternatively, though not illustrated here, the input code 742 may be located in the processor memory 704 or can be obtained from a network location, using the network interface 710. Processing of the input code 742 can include sorting the operations described in the input code 742 into layers (for example, similar to the input layer 102, first hidden layer 104, second hidden layer 106, third hidden layer 108), and the output layer 110, where the outputs of one layer provide the inputs to a next layer. For the stacks of dilated CNNs, the output of the first stack can provide the inputs to the next stack. Processing can also include identifying steps to be performed by the processor 702, rather than by the acceleration engine 600. For example, the processor 702, through the execution of a driver 722, may need to perform steps such as configuring Direct Memory Access (DMA) descriptors for moving data into or out of the acceleration engine 600, among other examples.

The output 734 of the first phase 732 can be organized, for example, in the layers, nodes, and connections between nodes of a neural network (e.g., similar to the dilated CNN 100, or the dilated CNN 400). The second phase 736 can perform intermediate processing on this output 734. For example, the operations performed in any one layer, or at any one node in a layer, may be too many for the acceleration engine 600 to perform at the same time. The acceleration engine 600 may, for example, have a limited amount of locale storage space for the data needed for a computation, or the computations may be more than the acceleration engine 600 can perform at one time. In this example, the first phase 732 can break the operations of the layer or node down into smaller operations, which can fit into the acceleration engine's local memory and/or can fit into the computing capacity of the acceleration engine 600. Processing of the output 734 of the first phase 732 can include other steps, such as scheduling, or determining the order in which the acceleration engine 600 and/or processor 702 will perform operations, among other examples. For example, processing of the output 734 of the first phase 732 can include determining the order of performing the operations by the acceleration engine 600 that are associated with step 1, step 2, and step 3 as discussed with reference to FIGS. 2-3.

In various examples, the output 738 of the second phase 736 includes the various steps to be performed by components of the acceleration engine 600, in the order that the steps are to be performed. The output 738 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples. In certain embodiments, the data flow graph may also include dependency of the shared states among the CEs 602a-602n.

The third phase 740 can operate on the output 738 of the second phase 736, and perform various steps before producing the instructions that are to be executed by the acceleration engine 600. These steps can include, for example, removing redundant dependencies, resolving or handling dependencies between nodes by inserting synchronization instructions into the code, identifying possibly optimizations in memory usage or memory bandwidth usage, and other operations.

In some examples, the third phase 740 can include a data scheduler 750 to schedule movement of data, such as input data and weight data, in the acceleration engine 600 to support various operations, such as convolution operation and dilated convolution operations as described above. For example, the data scheduler 750 can obtain an instruction (e.g., from the data flow graph) to perform a convolution operation (e.g., normal convolution, dilated convolution, etc.) between an input dataset and a weight dataset to generate an output dataset. In certain embodiments, the data scheduler 750 can determine a target size of each chunk in the input dataset to assign to a respective CE based on the size of the input dataset, compute capacity of the CEs, memory capacity of each CE, and transmission time between the CEs, among other factors. The input dataset can be divided into N chunks at runtime based on the target size used by the compiler 730. In other embodiments, the chunk size can be decided by the user at runtime. The data scheduler 750 can determine sequence of instructions to stage the convolution operations to be performed by each of the CEs 602a-602n in parallel to generate the output feature map according to certain embodiments described with reference to FIGS. 2-3. For example, the data scheduler 750 can determine the sequence of loading the weight data elements, input data elements, intermediate states or the shared states into the processing engine array 508 to perform the convolution operations. In certain embodiments, the data scheduler 750 can determine the addresses for fetching the input data elements, weight elements, or the intermediate states from the memory subsystem 504 based on the dilation rate, stride, etc., and include the addresses as part of the memory fetch parameters 534 instructions. The data scheduler 750 can also determine the set of buffer write parameters 536 including a destination offset and a number of write elements to write the intermediate states (including shared states) or the output data elements generated by the processing engine array 508 into the memory subsystem 504. The data scheduler 750 can also determine the shared states 510 that need to be shared between the CEs from the set of states generated by the processing engine array 508 and stored in the memory subsystem 504. The data scheduler 750 can also determine whether the pre-computed states to be used by a first CE have to be assigned known, static or random values based on the application of the neural network model.

The output of the third phase 740 is compiled code 744, which may include machine instructions in binary format. In some examples, the compiled code 744 can be stored in the processor memory 704. Alternatively or additionally, the compiled code 744 can be copied to the storage device 706 or to a network location. As noted above, the acceleration engine 600 may be located at a different host system, in which case the compiled code 744 can be sent over the network interface 710 to the other host system. The host system comprising the acceleration engine 600 may include one or more processors, memory, controllers, network interface, and other suitable components. The acceleration engine 600 can execute the compiled code 744 which may include instructions that can be executed by the N CEs to implement various embodiments. The instructions may also include an instruction to obtain pre-computed states to be used by a first CE in the N CEs as discussed with reference to FIGS. 3 and 4B. The pre-computed states may be computed by the processor(s) using a first portion of the input dataset to generate known values, or assigned random or static values based on the instruction.

In the example of FIG. 7, the host system 700 can be executing a driver 722, which can also be referred to as a device driver or runtime driver, that manages the acceleration engine 600. The driver 722 can provide an interface between applications executing on the host system 700 (or on another host system) and the acceleration engine 600. For example, the driver 700 can provide an Application Program Interface (API) that defines functions for feeding input data to the acceleration engine 600 and defining the operation to perform on the input data. In this and other examples, the driver 722 can configure the acceleration engine 600 to perform the operation. For example, the driver 722 can identify a neural network (e.g., a dilated CNN) that the acceleration engine 600 is to execute, as well as the location in the processor memory 704 or on the storage device 706 where the compiled code 744 for the neural network is located. The driver 722 can further load into the acceleration engine 600 or cause the acceleration engine 600 to load the compiled code 744, can load or cause the acceleration engine 600 to load the input data on which the neural network is to operate (e.g., input dataset 522), and/or can cause the acceleration engine 600 to begin executing on the input data. Once the acceleration engine 600 has finished, the acceleration engine 600 can notify the driver 722, and the driver 722 can deliver a result back to the application that requested the result.

certain examples, the host system 700 can be one of the nodes on a network that includes multiple nodes. The multiple nodes in the network may include other host systems or computing devices. One or more computing devices may include a memory for storing program instructions, a processor for executing the instructions, and a network interface for connecting to the network. For example, the network can be used to process data. The input data can be received at one of the nodes or from other networks with which the network can communicate. In this example, the input data can be directed to a node in the network that includes an acceleration engine (e.g., similar to the acceleration engine 600), for the acceleration engine to operate on and produce a result. The result can then be transferred to the node or other network from which the input data was received. In various examples, the input data can be accumulated from various sources, including one or more of the nodes and/or computing devices located in the other networks, and the accumulated input data can be directed to one or more host systems in the network. Results from the host systems can then be distributed back to the sources from which the input data was gathered.

Figure 8:
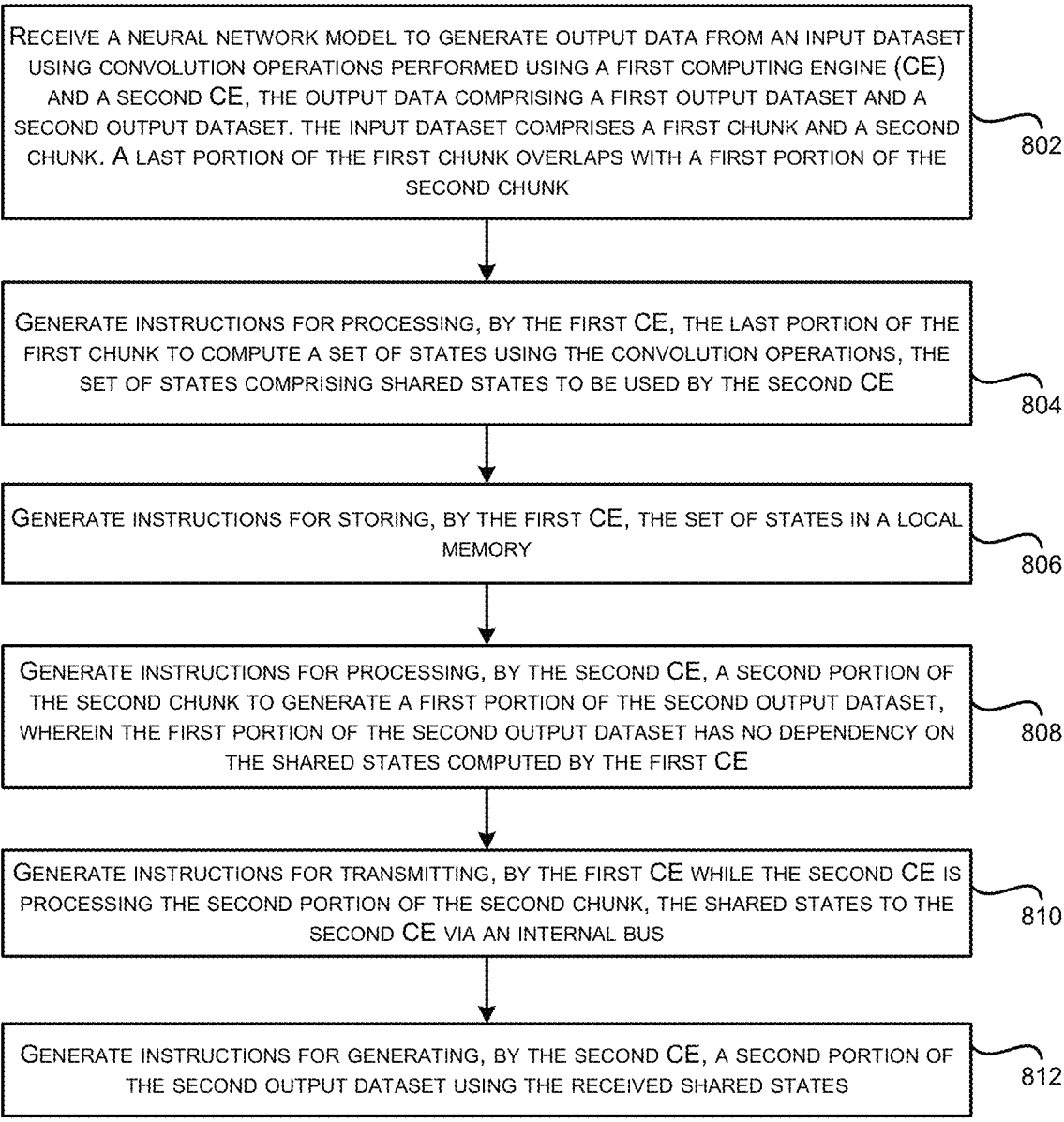
FIG. 8 includes a flowchart illustrating an example of a computer-implemented method for accelerating neural networks according to the first embodiment.

FIG. 8 includes a flowchart 800 illustrating an example of a computer-implemented method for accelerating neural networks according to the first embodiment. The neural network can include CNNs or dilated CNNs (for example, dilated CNN 100). In certain examples, the neural network can be one of the dilated CNNs in the dilated CNN 400. The computer-implemented method may be performed by a host system, such as the host system 700 described with reference to FIG. 7. Some of the operations described in the flowchart 800 may be performed by the compiler 730 running on the host system 700.

At step 802, the host system 700 may receive a neural network model to generate output data from an input dataset using convolution operations performed using a first CE and a second CE. The output data may comprise a first output dataset and a second output dataset. The input dataset may comprise a first chunk and a second chunk. A last portion of the first chunk may overlap with a first portion of the second chunk. The convolution operations may be performed by the first CE and the second CE to generate an output tensor that includes the output data corresponding to an output feature map by performing inference on the input dataset (e.g., input feature map). The neural network model may be represented by a data flow graph as described with reference to FIG. 7. The neural network model can be implemented using the CEs 602a-602n in the acceleration engine 600 executing in parallel. Each of the CEs 602a-602n may be similar to the CE 502 described with reference to FIGS. 5A-5C. Each CE may include a respective two-dimensional processing element array 508. Each processing element array 508 may include, for example, 64, 128, or more rows. The input dataset may include input data elements associated with an image being submitted for identification or object recognition, an audio clip being provided for speech recognition, a string of text for natural language processing or machine translation, or the current state of a game requiring analysis to determine a next move, among other things. In certain examples, the input dataset can be processed by an input layer of the first stack 400-1 as discussed with reference to FIG. 4A.

As an example, the first CE and the second CE can be the first CE 202a and the second CE 202b, and the input dataset can be divided into chunks comprising the first chunk 204a and the second chunk 204b assigned to the first CE 202a and the second CE 202b, respectively. The output data can correspond to the output dataset 216 in FIG. 2. For example, the first output dataset can be the portion 216a of the output dataset 216, and the second output dataset can be the portion 216b of the output dataset 216. In certain examples, size of the first chunk 204a and the second chunk 204b can be determined by the compiler 730, however, division of the input dataset into chunks can be performed at runtime. The first CE 202a and the second CE 202b can be the first CE 602a and the second CE 602b, respectively, in the acceleration engine 600. The first CE 202a may receive certain portions of the first chunk 204a as part of its input dataset 522, and the second CE 202b may receive certain portions of the second chunk 204b as part of its input dataset 522. The respective portions of the first chunk 204a and the second chunk 204b can be stored in their respective memory subsystem 504 (e.g., in one or more memory rows 528, 530, etc.) to be fed to their respective processing engine array 508 for performing the convolution operations. In certain examples, if a third CE is used, the input dataset can be divided into the first chunk 204a, second chunk 204b, and the third chunk 204c assigned to the first CE 202a, second CE 202b, and the third CE 202c, respectively, and the output data may also include the portion 216c of the output dataset 216.

At step 804, the compiler 730 may generate instructions to be executed by each CE. For example, the instructions can be part of the compiled code 744. The instructions can be stored in the memory subsystem 504 or in a separate respective instruction buffer in each CE for execution by their respective controller 520 to control their respective processing engine array 508 to perform various computations on the weights and their input dataset 522. For example, the instructions may include an instruction for processing, by the first CE, the last portion of the first chunk to compute a set of states using the convolution operations. The set of states may comprise shared states to be used by the second CE. In certain examples, the last portion of the first chunk 204a can be read from the appropriate memory row using the memory access circuit 532 of the first CE 202a based on the set of memory fetch parameters 534, as discussed with reference to FIG. 5B. For example, the parameters start address, step, and the number of elements can be part of the instruction and can be parsed by the controller 520 such that the input data elements corresponding to the last portion 206a are fed to the processing engine array 508 to compute the set of states 210a comprising the shared states 208a as discussed with reference to step 1 of FIG. 2. The set of states may include a set of intermediate results generated using computations and accumulations through the processing engine array 508 for each hidden layer. The dilation rate for each layer can be controlled using the corresponding set of memory fetch parameters 534.

The instructions generated by the compiler 630 may also include an instruction for processing, by the second CE, the last portion of the second chunk to compute a set of states using the convolution operations. The second CE 202b may process its last portion 206b of the second chunk 204b to compute the second set of states 210b comprising the shared states 208b, as discussed with reference to step 1 of FIG. 2. In certain examples, if the third CE 202c is used, the third CE 202c may process its last portion 206c of the third chunk 204c to compute the third set of states 210c comprising the shared states 208c.

At step 806, the compiler 730 may generate instructions for storing, by the first CE, the set of states in a local memory. The instructions can be executed by the controller 520 in the first CE 202a to store the set of states 210a in the memory subsystem 504 in the first CE 202a to be transmitted to the second CE 202b. In different embodiments, the set of states 210a can be stored in the summation buffer 512 or in an independent memory component in the CE 502. In certain examples, the shared states 208a may be operated by the activation engine 516 or the pooling engine 518 before storing in the memory subsystem 504. The compiler 730 may also generate instructions for storing, by the second CE 202b, the set of states 210b in the memory subsystem 504 in the second CE 202b, and for storing, by the third CE 202c, the set of states 210c in the memory subsystem 504 in the third CE 202c. In certain examples, the set of states 210a, 210b, and 210c can be stored in the respective local memories of the first CE 202a, second CE 202b, and the third CE 202c as they process the last portion of their respective chunks. Thus, certain embodiments can eliminate the memory bandwidth bottlenecks by storing the shared states in the local memory of each CE.

At step 808, the compiler 730 may generate instructions for processing, by the second CE, a second portion of the second chunk to generate a first portion of the second output dataset. The first portion of the second output dataset has no dependency on the shared states computed by the first CE. As discussed with reference to step 2 in FIG. 2, the instructions can be executed by the controller 520 in the second CE 202b for processing the portion 212b of the second chunk 204b to generate the sub-portion 216b1 of the portion 216b of the output dataset which has no dependency on the shared states 208a computed by the first CE 202a. In certain examples, the second CE 202b can use the set of states 210b stored in its local memory to generate the sub-portion 216b1 of the output dataset 216. The compiler 730 may also generate instructions for processing, by the first CE, the second portion 212a of the first chunk 204a to generate the sub-portion 216a1 of the portion 216a of the output dataset 216 which has no dependency on the shared states computed by a preceding CE. The first CE 202a can also use the set of states 210a stored in the local memory to generate the sub-portion 216a1. Similarly, the third CE 202c may process the portion 212c of the third chunk 204c to generate the sub-portion 216c1 of the portion 216c of the output dataset 216 which has no dependency on the shared states 208b computed by the second CE 202b. The third CE 202c, if used, can also use the set of states 210c stored in its local memory to generate the sub-portion 216c1.

At step 810, the compiler 730 may generate instructions for transmitting, by the first CE while the second CE is processing the second portion of the second chunk, the shared states to the second CE via an internal bus. The instructions can be executed by the controller 520 in the first CE 202a for transmitting the shared states 208a stored in the memory subsystem 504 in the first CE 202a to the second CE 202b via the chip interconnect 524 (for example, the shared states 510), while the second CE 202b is processing the portion 212b in step 2 to generate the sub-portion 216b1. If a third CE is used, the compiler 730 may also generate instructions for transmitting, by the second CE 202b while the third CE 202c is processing the second portion 212c to generate the sub-portion 216c1, the shared states 208b to the third CE 202c via the chip interconnect 524 (for example, the shared states 510). As discussed with reference to step 2 in FIG. 3, the first CE 202a may obtain the pre-computed states 302 which can be received by the first CE 202a as the shared states from a preceding CE. The chip interconnect 524 can be part of the chip interconnect 620 and can include a PCI interface, AXI, APB, AMBA or another high performance bus. Thus, certain embodiments can improve the system performance by transmitting the shared states using an internal bus that is higher performance than the system memory interface.

At step 812, the compiler 730 may generate instructions for generating, by the second CE, a second portion of the second output dataset using the received shared states. The instructions can be executed by the controller 520 in the second CE 202b for generating the sub-portion 216b2 of the output dataset 216 using the received shared states 208a as discussed with reference to step 3 in FIG. 2. In certain embodiments, the shared states 208a may be received by the second CE 202b via the chip interconnect 524 as part of the shared states 510, and can be stored in the memory subsystem 504. The shared states 208a can be fed to the processing engine array 508 in the second CE 202b along with the portion 214b using the appropriate set of memory fetch parameters 534 to generate the sub-portion 216b2 using computations and accumulations through the processing engine array 508. If the third CE is used, the instructions may also include an instruction for processing, by the third CE 202c, the portion 214c and the received shared states 208b for generating the sub-portion 216c2 of the output dataset. In the first embodiment, the instructions may also include an instruction for processing, by the first CE, the portion 218 and the portion 214a for generating the sub-portion 216a2 of the output dataset 216, as discussed with reference to FIG. 2. In the second embodiment, the instructions may include an instruction for generating, by the first CE 202a while the second CE 202b is generating the sub-portion 216b2 of the output dataset 216, the sub-portion 216a2 of the output dataset 216 using the pre-computed states 302 as discussed with reference to step 3 in FIG. 3.

Figure 9:
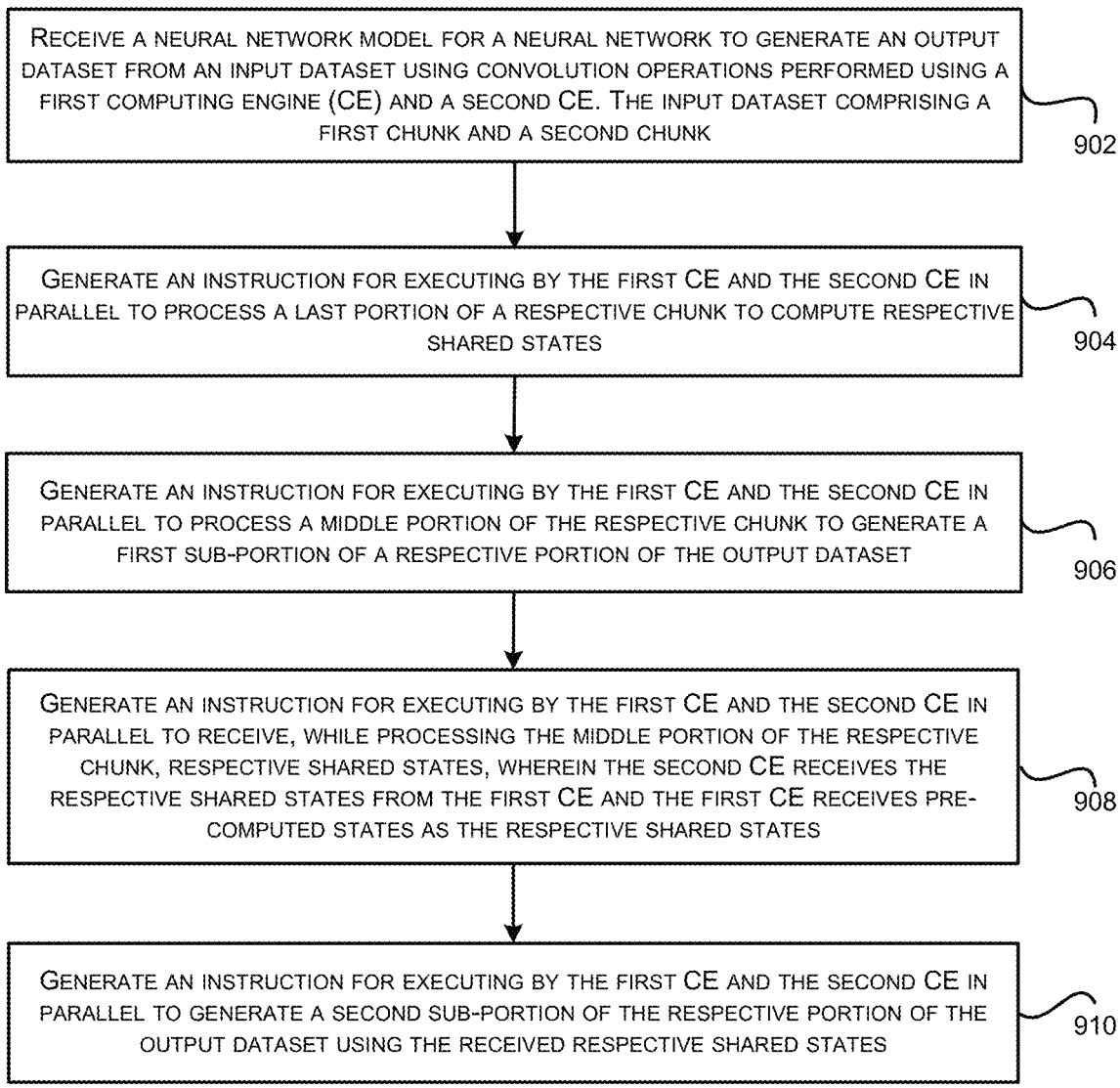
FIG. 9 includes a flowchart illustrating another example of a computer-implemented method for accelerating neural networks according to the second embodiment.

FIG. 9 includes a flowchart 900 illustrating an example of a computer-implemented method for accelerating neural networks according to the second embodiment. The neural network can include a CNN or a dilated CNN. In certain examples, the neural network can be one of the dilated CNNs comprising a stack of convolutional layers in the dilated CNN 400. The computer-implemented method may be performed by a host system, such as the host system 700 described with reference to FIG. 7. Some of the operations described in the flowchart 900 may be performed by the compiler 730 running on the host system 700.

At step 902, the host system 700 may receive a neural network model for a neural network to generate an output dataset from an input dataset using convolution operations performed using a first CE and a second CE. The convolution operations may be performed to generate an output tensor that includes an output dataset (e.g., output feature map) by performing inference on an input dataset (e.g., input feature map). The neural network model may be represented by a data flow graph as described with reference to FIG. 7. The neural network model can be implemented using the CEs 602a-602n in the acceleration engine 600 executing in parallel. Each of the CEs 602a-602n may be similar to the CE 502 described with reference to FIGS. 5A-5C. Each CE may include a respective two-dimensional processing element array 508. Each processing element array 508 may include, for example, 64, 128, or more rows. The input dataset may include input data elements associated with an image being submitted for identification or object recognition, an audio clip being provided for speech recognition, a string of text for natural language processing or machine translation, or the current state of a game requiring analysis to determine a next move, among other things. In certain examples, the neural network model may belong to the dilated CNN 400, and the input dataset can be processed by an input layer of the first stack 400-1 as discussed with reference to FIG. 4B.

As an example, the first CE and the second CE can be the first CE 202a and the second CE 202b and the input dataset can be divided into chunks comprising the first chunk 204a and the second chunk 204b assigned to the first CE 202a and the second CE, respectively. The output dataset can correspond to the output dataset 216 in FIG. 3. In certain examples, size of the first chunk 204a and the second chunk 204b can be determined by the compiler 730, however, division of the input dataset into chunks can be performed at runtime. The first CE 202a and the second CE 202b can be the first CE 602a and the second CE 602b, respectively, in the acceleration engine 600. The first CE 202a may receive certain portions of the first chunk 204a as part of its input dataset 522, and the second CE 202b may receive certain portions of the second chunk 204b as part of its input dataset 522. The respective portions of the first chunk 204a and the second chunk 204b can be stored in their respective memory subsystem 504 (e.g., in one or more memory rows 528, 530, etc.) to be fed to their respective processing engine array 508 for performing the convolution operations. In certain examples, if a third CE is used, the input dataset can be divided into the first chunk 204a, second chunk 204b, and the third chunk 204c assigned to the first CE 202a, second CE 202b, and the third CE 202c, respectively.

At step 904, the compiler 730 may generate instructions to be executed by the first CE and the second CE in parallel. For example, the instructions can be part of the compiled code 744. The instructions can be stored in the memory subsystem 504 or in a separate respective instruction buffer in each CE for execution by their respective controller 520 to control their respective processing engine array 508 to perform various computations on the weights and their input dataset 522. For example, the instructions may include an instruction to process a last portion of a respective chunk to compute respective shared states. As discussed with reference to step 1 in FIG. 3, the first CE 202a may process the last portion 206a of the first chunk 204a to compute the shared states 208a. The second CE 202b may process the last portion 206b of the second chunk 204b to compute the shared states 208b. The shared states 208a may be stored in the memory subsystem 504 in the first CE 202a, and the shared states 208b may be stored in the memory subsystem 504 in the second CE 202b.

At step 906, the instructions may include an instruction to be executed by the first CE and the second CE in parallel to process a middle portion of the respective chunk to generate a first sub-portion of a respective portion of the output dataset. As discussed with reference to step 2 in FIG. 3, the first CE 202a may process the middle portion 212a of the first chunk 204a to generate the sub-portion 216a1 of the portion 216a of the output dataset 216 using the computed shared states 208a. Simultaneously, the second CE 202b may process the middle portion 212b of the second chunk 204b to generate the sub-portion 216b1 of the portion 216b of the output dataset 216 using the computed shared states 208b.

At step 908, the instructions may include an instruction to be executed by the first CE and the second CE in parallel to receive, while processing the middle portion of the respective chunk, respective shared states, wherein the second CE receives the respective shared states from the first CE and the first CE receives pre-computed states as the respective shared states. As discussed with reference to step 3 in FIG. 3, the second CE 202a may receive, while processing the middle portion 212b of the second chunk 204b, the shared states 208a from the first CE 202a, while the first CE 202a receives the pre-computed states 302 as the shared states while processing the middle portion 212a of the first chunk 204a. The pre-computed states 302 may be obtained before executing the instructions to perform the convolution operations. For example, the first CE 202a may execute an instruction to obtain the pre-computed states 302. In various embodiments, the pre-computed states 302 may be computed using an initial portion of the first chunk 202a, or assigned random or static values. The second CE 202b may receive the shared states 208a via the chip interconnect 524 as the shared states 510.

At step 910, the instructions may include an instruction to be executed by the first CE and the second CE in parallel to generate a second sub-portion of the respective portion of the output dataset using the received respective shared states. As discussed with reference to step 3 in FIG. 3, the first CE 202a may generate the portion 216a2 of the output dataset 216 using the pre-computed states 302, and the second CE 202b may generate the portion 216b2 of the output dataset 216 using the shared states 208a.

In certain examples, the steps 904-910 can be executed by the first CE 202a and the second CE 202b for each stack of the dilated CNN 400. For example, for the first stack, the pre-computed states 410-1 can be received by the first CE 202a as the shared states while the shared states 404-1 are received by the second CE 202b. For the second stack, the pre-computed states 410-2 can be received by the first CE 202a as the shared states while the shared states 404-2 are received by the second CE 202b. For the third stack, the pre-computed states 410-3 can be received by the first CE 202a as the shared states while the shared states 404-3 are received by the second CE 202b. For the fourth stack, the pre-computed states 410-4 can be received by the first CE 202a as the shared states while the shared states 404-4 are received by the second CE 202b. Each of the pre-computed states 410-1, 410-2, 410-3, and 410-4 can be obtained similar to the pre-computed states 302.

Figure 10:
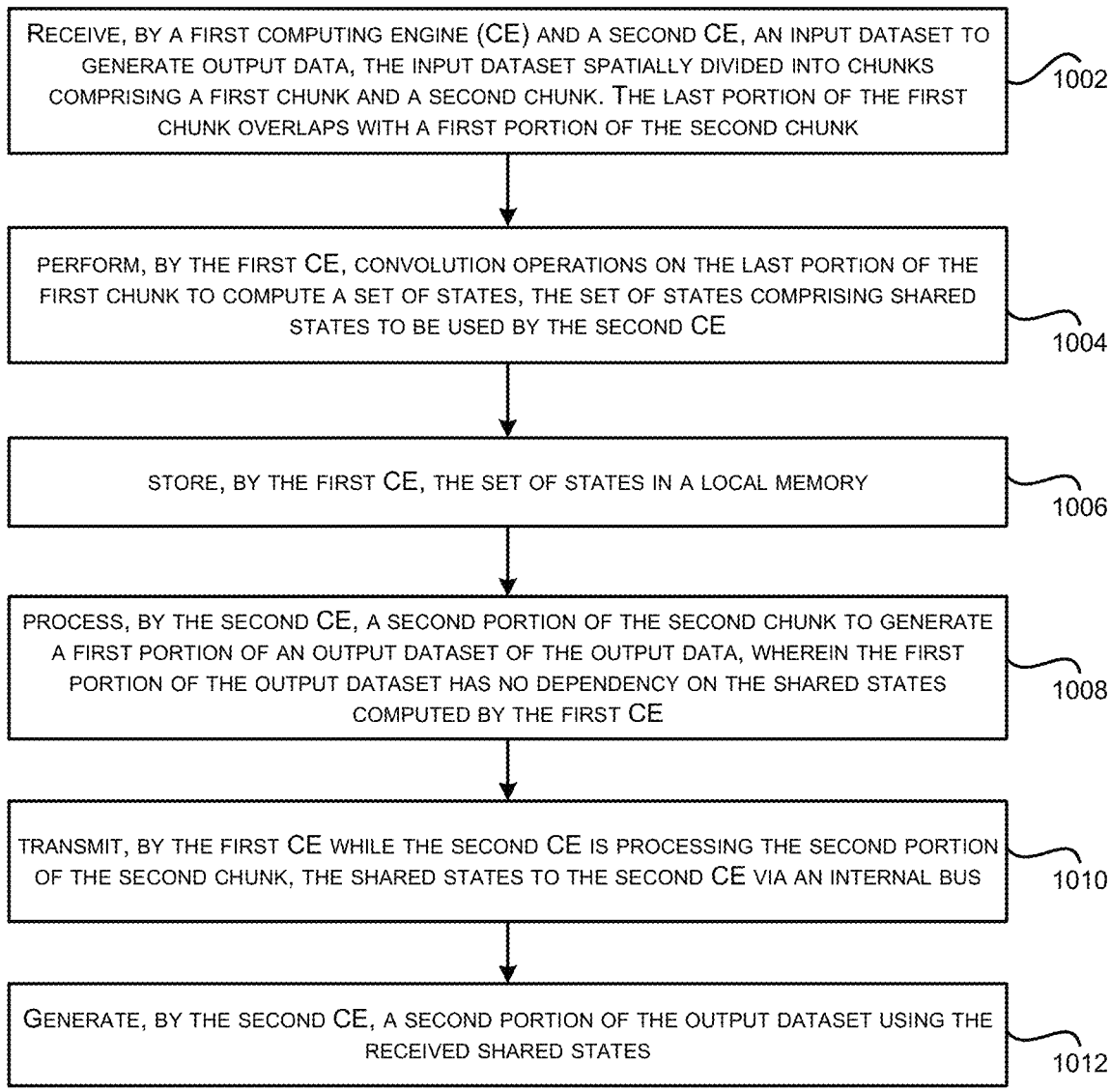
FIG. 10 includes a flowchart illustrating a method implemented by the CEs according to the first embodiment.

FIG. 10 includes a flowchart 1000 illustrating an example of a method executed by the CEs to accelerate a neural network according to the first embodiment. The neural network can include CNNs or dilated CNNs similar to the dilated CNN 100. The method may be performed by two or more CEs.

At step 1002, a first CE and a second CE may receive an input dataset to generate output data. The input dataset may be spatially divided into chunks comprising a first chunk and a second chunk, and the last portion of the first chunk may overlap with a first portion of the second chunk. For example, the method can be executed by the first CE 202a and the second CE 202b, as discussed with reference to steps 1, 2, and 3 in FIG. 2. The input dataset can be spatially divided into chunks comprising the first chunk 204a and the second chunk 204b. The input dataset may include input data elements associated with an image being submitted for identification or object recognition, an audio clip being provided for speech recognition, a string of text for natural language processing or machine translation, or the current state of a game requiring analysis to determine a next move, among other things. In certain examples, the input dataset can be a first input dataset of a large input feature map divided into multiple input datasets. The first CE 202a can receive the middle portion 212a and the last portion 206a of the first chunk 204a, and the second CE 202b can receive the middle portion 212b and the last portion 206b of the second chunk 204b. The first CE may also receive the first portion 218 or pre-computed states. The output data may correspond to the output dataset 216 comprising the portions 216a and 216b.

At step 1004, the first CE may perform convolution operations on the last portion of the first chunk to compute a set of states. The set of states may comprise shared stated to be used by the second CE. The first CE 202a may perform convolution operations on the last portion 206a using the processing engine array 508 to compute the set of states 210a comprising the shared states 208a to be used by the second CE 202b. Similarly, second CE 202a may perform convolution operations on the last portion 206b using the processing engine array 508 to compute the set of states 210b comprising the shared states 208b to be used by the third CE 202c.

At step 1006, the first CE may store the set of states in a local memory. The first CE 202a may store the set of states 210*a* in the memory subsystem 504 in the first CE 202*a*. Similarly, the second CE 202*b* may store the set of states 210*b* in the memory subsystem 504 in the second CE 202*b*. In certain examples, the set of states 210*a* and 210*b* can be stored in the respective local memories of the first CE 202*a* and the second CE 202*b* as they perform convolution operations on the last portion of their respective chunks in the step 1004.

At step 1008, the second CE may process a second portion of the second chunk to generate a first portion of an output dataset of the output data. The first portion of an output dataset of the output data has no dependency on the shared states computed by the first CE. The second CE 202*b* may process the middle portion 212*b* of the second chunk 204*b* to generate the sub-portion 216*b*1 of the portion 216*b* of the output dataset 216, which has no dependency on the shared states 208*a* computed by the first CE 202*a*. Similarly, the first CE 202*a* may process the middle portion 212*a* of the first chunk 204*a* to generate the sub-portion 216*a*1 of the portion 216*a* of the output dataset 216, which has no dependency on the shared states computed by a preceding CE.

At step 1010, the first CE may transmit, while the second CE is processing the second portion of the second chunk, the shared states to the second CE. The first CE 202*a* may transmit, while the second CE 202*b* is processing the middle portion 212*b* of the second chunk 204*b*, the shared states 208*a* to the second CE 202*b*. The first CE 202*a* may transmit the shared states 208*a* stored in the memory subsystem 504 in the first CE 202*a* to the second CE 202*b* via the chip interconnect 524 (for example, via the shared states 510).

At step 1012, the second CE may generate a second portion of the output dataset using the received shared states. The second CE 202*b* may generate the sub-portion 216*b*2 of the portion 216*b* using the received shared states 208*a*. For example, the shared states 208*a* may be received by the second CE 202*b* via the chip interconnect 524 as part of the shared states 510, and can be stored in the memory subsystem 504 in the second CE 202*b*. The stored shared states 208*a* can be fed to the processing engine array 508 in the second CE 202*b* along with the portion 214*b* using the appropriate set of memory fetch parameters 534 to generate the sub-portion 216*b*2 using computations and accumulations through the processing engine array 508. In the first embodiment, the first CE 202*a* may process the first portion 218 to generate the sub-portion 216*a*2 of the portion 216*a* as discussed in step 3 of FIG. 2. Thus, certain embodiments can eliminate the memory bandwidth bottlenecks by storing the shared states in the local memory of each CE, and improve the system performance by transmitting the shared states using an internal bus that is higher performance than the system memory interface.

FIG. 11 includes a flowchart 1100 illustrating an example of a method executed by the CEs to accelerate a neural network according to the second embodiment. The neural network can include CNNs or dilated CNNs similar to the dilated CNN 100. The method may be performed by two or more CEs.

At step 1102, a first CE and a second CE may receive an input dataset divided into chunks comprising a first chunk and a second chunk to generate respective portions of an output dataset using convolution operations. The input dataset may be spatially divided into chunks comprising a first chunk and a second chunk, and the last portion of the first chunk may overlap with a first portion of the second chunk. The first CE may receive a middle and a last portion of the first chunk, and the second CE may receive a middle and a last portion of the second chunk. As an example, the method can be executed by the first CE 202*a* and the second CE 202*b*, as discussed with reference to steps 1, 2, and 3 in FIG. 3. The input dataset can be spatially divided into chunks comprising the first chunk 204*a* and the second chunk 204*b*. The first CE 202*a* can receive the middle portion 212*a* and the last portion 206*a* of the first chunk 204*a*, and the second CE 202*b* can receive the middle portion 212*b* and the last portion 206*b* of the second chunk 204*b*. The first CE may also receive the pre-computed states 302, which may include known or static values. For example, the known values can be determined by processing the first portion 218 of the first chunk 204*a* prior to making an inference on the input dataset. The output data may correspond to the output dataset 216 comprising the portions 216*a* and 216*b*.

At step 1104, each of the first CE and the second CE may process a respective last portion of a respective chunk to compute respective shared states. The first CE 202*a* may process the last portion 206*a* using the processing engine array 508 to compute the shared states 208*a*, and the second CE 202*a* may process the last portion 206*b* using the processing engine array 508 to compute the shared states 208*b*. The shared states 208*a* and 208*b* can be stored in the respective local memories of the first CE 202*a* and the second CE 202*b* as they process the last portion of their respective chunks.

At step 1106, each of the first CE and the second CE may process a respective middle portion of the respective chunk to generate a first sub-portion of a respective portion of the output dataset. The first CE 202*a* may process the middle portion 212*a* of the first chunk 204*a* to generate the sub-portion 216*a*1 of the portion 216*a* of the output dataset 216. The second CE 202*b* may process the middle portion 212*b* of the second chunk 204*b* to generate the sub-portion 216*b*1 of the portion 216*b* of the output dataset 216.

At step 1108, each of the first CE and the second CE may receive respective shared states while processing the middle portion of the respective chunk. The respective shared states received by the second CE are computed by the first CE, and the respective shared states received by the first CE are pre-computed states. The first CE 202*a* may receive the pre-computed states 302 as the shared states while processing the middle portion 212*a* of the first chunk 204*a*. The second CE 202*b* may receive the shared states 208*a* from the first CE 202*a* while processing the middle portion 212*b* of the second chunk 204*b*. The shared states 208*a* may be received by the second CE 202*b* via the chip interconnect 524 as part of the shared states 510, and can be stored in the memory subsystem 504 in the second CE 202*b*. Similarly, the pre-computed states 302 may be received by the first CE 202*a* via the chip interconnect 524 as part of the shared states 510, and can be stored in the memory subsystem 504 in the first CE 202*a*.

At step 1110, each of the first CE and the second CE may generate a second sub-portion of the respective portion of the output dataset using the received respective shared states. The first CE 202*a* may generate the sub-portion 216*a*2 of the portion 216*a* using the pre-computed states 302, and the second CE 202*b* may generate the sub-portion 216*b*2 of the portion 216*b* using the received shared states 208*a*.

In certain examples, the method described above using the steps 1102-1110 can be executed by each stack in the dilated CNN 400 in FIG. 4B. The output dataset generated by the first stack 400-1 can be used as the input dataset by the second stack 400-2, the output dataset generated by the second stack 400-2 can be used as the input dataset by the third stack 400-3, and the output dataset generated by the third stack 400-3 can be used as the input dataset by the fourth stack 400-4. Each stack can use the respective pre-computed states 410-1, 410-2, 410-3, and 410-4 to generate the respective portions of the respective output dataset. Use of the respective pre-computed states for each stack can reduce the overall computations as compared to having a single stack with a larger number of convolutional layers. Additionally, transmitting the shared states between the CEs for each stack using an internal bus can provide improved system performance.

Although the flowcharts 800, 900, 1000, and 1100 describe the operations as a sequential process, in various embodiments, many of the operations for any of the methods may be performed in parallel or concurrently. In addition, the order of the operations may be rearranged. A method may have additional steps not shown in the respective FIG. 8, 9, 10 or 11. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium.

The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. As used herein, PCI-based devices also include devices that communicate using Non-Volatile Memory Express (NVMe). NVMe is a device interface specification for accessing non-volatile storage media attached to a computing system using PCIe. A PCI-based device may include one or more functions. A "function" describes operations that may be provided by the device. Examples of functions include mass storage controllers, network controllers, display controllers, memory controllers, serial bus controllers, wireless controllers, and encryption and decryption controllers. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are suscep-tible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method to accelerate a dilated convolution neural network (CNN), the method comprising:
   receiving a neural network model that includes convolution operations for generating an output dataset from an input dataset using N computing engines (CEs) executing in parallel, wherein the N CEs are part of a neural network processor, and wherein the input dataset is to be transferred to the neural network processor from an external memory and comprises N chunks of equal size, each chunk to be processed by a respective CE to generate a respective portion of the output dataset;

generating an instruction for obtaining pre-computed states to be used by a first CE from the N CEs; and generating, based on the neural network model, a same set of instructions to be executed by each CE in parallel for:
processing a last portion of a respective chunk to compute respective shared states;
processing a middle portion of the respective chunk to generate a first sub-portion of the respective portion of the output dataset while receiving additional shared states for processing, wherein:
the additional shared states correspond, in instances where a first portion of the respective chunk overlaps with a last portion of a respective chunk for a preceding CE, to the respective shared states computed by the preceding CE and are received through transfer between a local memory of the CE and a local memory of the preceding CE,
the respective shared states computed by the preceding CE are received as a substitute for intermediate states that would otherwise have been computed by the CE using the first portion of the respective chunk, and
the first CE is able to execute the same set of instructions due to receiving the pre-computed states as the additional shared states; and
generating a second sub-portion of the respective portion of the output dataset using the received additional shared states.

2. The computer-implemented method of claim 1, wherein the dilated CNN includes stacks of convolutional layers comprising a first stack and a second stack, the first stack comprising, from bottom to top, a first input layer, a first set of hidden layers, and a first output layer, the second stack comprising, from the bottom to the top, a second input layer, a second set of hidden layers, and a second output layer, and wherein the input dataset is processed by the first stack to generate the output dataset, and the output dataset is used as the input dataset for the second stack.

3. The computer-implemented method of claim 2, wherein the same set of instructions are executed by each CE in parallel for each stack.

4. The computer-implemented method of claim 2, wherein the pre-computed states include first pre-computed states and second pre-computed states, wherein the first CE receives the first pre-computed states as shared states for the first stack and the second pre-computed states as shared states for the second stack.

5. A computer-implemented method comprising:
receiving a neural network model for a neural network, the neural network being configured to generate an output dataset from an input dataset using convolution operations performed by at least a first computing engine (CE) and a second CE, wherein the first CE and the second CE are part of a neural network processor, and wherein the input dataset is to be transferred to the neural network processor from an external memory and comprises a first chunk and a second chunk; and
generating, based on the neural network model, instructions for executing by the first CE and the second CE in parallel to:
process a last portion of a respective chunk to compute respective shared states;
process a middle portion of the respective chunk to generate a first sub-portion of a respective portion of the output dataset;
receive, while processing the middle portion of the respective chunk, additional shared states for processing, wherein:
the first chunk is the respective chunk for the first CE,
the second chunk is the respective chunk for the second CE,
the last portion of the first chunk overlaps with a first portion of the second chunk,
the additional shared states received by the second CE are the respective shared states computed by the first CE and are obtained from a local memory of the first CE,
the second CE receives the respective shared states computed by the first CE as a substitute for intermediate states that would otherwise have been computed by the second CE using the first portion of the second chunk, and
the first CE receives pre-computed states as the additional shared states; and
generate a second sub-portion of the respective portion of the output dataset using the received additional shared states.

6. The computer-implemented method of claim 5, further comprising:
generating an instruction to obtain the pre-computed states to be used by the first CE.

7. The computer-implemented method of claim 5, wherein the pre-computed states have known or static values.

8. The computer-implemented method of claim 5, further comprising generating an additional instruction for executing by the first CE and the second CE in parallel to:
store the respective shared states in a respective local memory while processing the last portion of the respective chunk.

9. The computer-implemented method of claim 8, wherein:
the input dataset is a first input dataset in an input feature map for making an interference,
pre-computed states received by the first CE in connection with processing the first input dataset correspond to static or random values,
the input feature map further comprises a second input dataset having a respective first chunk and second chunk, and
pre-computed states received by the first CE in connection with processing the second input dataset correspond to shared states computed by, and stored in a local memory of, the second CE or another CE in the neural network processor during processing of the first input dataset.

10. The computer-implemented method of claim 5, the method further comprising generating an additional instruction for executing by the first CE and the second CE in parallel to:
generate a third sub-portion of the respective portion of the output dataset using the computed respective shared states.

11. The computer-implemented method of claim 5, wherein the second CE receives the respective shared states computed by the first CE through an internal bus of the neural network processor.

12. The computer-implemented method of claim 5, wherein the neural network is a dilated convolutional neural network (CNN) comprising stacks of dilated convolutional layers, each stack comprising, from bottom to top, a respective input layer followed by a respective set of hidden layers and a respective output layer.

13. The computer-implemented method of claim 12, wherein the convolution operations are performed by each layer at a respective dilation rate for each stack that increases from the bottom to the top for each of the hidden layers and the output layer.

14. The computer-implemented method of claim 5, wherein the first CE comprises a first systolic array including a first set of processing elements arranged in rows and columns to perform the convolution operations, and the second CE comprises a second systolic array including a second set of processing elements arranged in rows and columns to perform the convolution operations.

15. The computer-implemented method of claim 5, wherein the first CE and the second CE are a first processor core and a second processor core of the neural network processor.

16. A non-transitory computer readable medium having stored therein instructions that, when executed by one or more processors cause the one or more processors to execute a compiler, the compiler performing operations including:
  receiving a neural network model for a neural network, the neural network being configured to generate an output dataset from an input dataset using convolution operations performed by at least a first computing engine (CE) and a second CE, wherein the first CE and the second CE are part of a neural network processor, and wherein the input dataset is to be transferred to the neural network processor from an external memory and comprises a first chunk and a second chunk; and
  generating, based on the neural network model, instructions for executing by the first CE and the second CE in parallel to:
    process a last portion of a respective chunk to compute respective shared states;
    process a middle portion of the respective chunk to generate a first sub-portion of a respective portion of the output dataset;
    receive, while processing the middle portion of the respective chunk, additional shared states for processing, wherein:
      the first chunk is the respective chunk for the first CE,
      the second chunk is the respective chunk for the second CE,
      the last portion of the first chunk overlaps with a first portion of the second chunk,
      the additional shared states received by the second CE are the respective shared states computed by the first CE and are obtained from a local memory of the first CE,
      the second CE receives the respective shared states computed by the first CE as a substitute for intermediate states that would otherwise have been computed by the second CE using the first portion of the second chunk, and
      the first CE receives pre-computed states as the additional shared states; and
    generate a second sub-portion of the respective portion of the output dataset using the received additional shared states.

17. The non-transitory computer readable medium of claim 16, wherein the compiler is executed on a first computer system, and wherein the neural network processor is an acceleration engine on a second computer system.

18. The non-transitory computer readable medium of claim 16, wherein the first CE and the second CE are integrated circuits that include an on-chip memory for storing shared states, the on-chip memory of the first CE being the local memory that stores the additional shared states received by the second CE.

19. The non-transitory computer readable medium of claim 16, the operations further including generating an instruction to obtain the pre-computed states to be used by the first CE.

20. A method comprising:
  receiving, by a first computing engine (CE) and a second CE in a neural network processor, an input dataset divided into chunks comprising a first chunk and a second chunk, each chunk to be processed by a respective CE to generate a respective portion of an output dataset using convolution operations, wherein:
    the input dataset is transferred to the neural network processor from an external memory,
    the first chunk and the second chunk each include a first portion, a middle portion, and a last portion,
    the first chunk is the respective chunk for the first CE,
    the second chunk is the respective chunk for the second CE, and
    the last portion of the first chunk overlaps with the first portion of the second chunk;
  processing, by each of the first CE and the second CE, the last portion of the respective chunk to compute respective shared states;
  processing, by each of the first CE and the second CE, the middle portion of the respective chunk to generate a first sub-portion of the respective portion of the output dataset;
  receiving, by each of the first CE and the second CE and while processing the middle portion of the respective chunk, additional shared states for processing, wherein:
    the additional shared states received by the second CE are the respective shared states computed by the first CE and are obtained from a local memory of the first CE,
    the second CE receives the respective shared states computed by the first CE as a substitute for intermediate states that would otherwise have been computed by the second CE using the first portion of the second chunk, and
    the additional shared states received by the first CE are pre-computed states; and
  generating, by each of the first CE and the second CE, a second sub-portion of the respective portion of the output dataset using the received additional shared states.

* * * * *